(12) United States Patent
Sibbach et al.

(10) Patent No.: US 12,313,021 B1
(45) Date of Patent: May 27, 2025

(54) OUTER NACELLE WITH INLET GUIDE VANES AND ACOUSTIC TREATMENT

(71) Applicant: General Electric Company, Schenectady, NY (US)

(72) Inventors: Arthur William Sibbach, Boxford, MA (US); Nicholas Joseph Kray, Mason, OH (US); Brandon Wayne Miller, Liberty Township, OH (US); Gary Willard Bryant, Jr., Loveland, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/604,610

(22) Filed: Mar. 14, 2024

(51) Int. Cl.
| | |
|---|---|
| *F02K 3/06* | (2006.01) |
| *F01D 9/04* | (2006.01) |
| *F01D 25/24* | (2006.01) |
| *F02C 7/045* | (2006.01) |
| *F02C 7/24* | (2006.01) |

(Continued)

(52) U.S. Cl.
CPC ............... *F02K 3/06* (2013.01); *F02C 7/045* (2013.01); *F02C 7/24* (2013.01); *F04D 29/526* (2013.01); *F04D 29/541* (2013.01); *F04D 29/542* (2013.01); *F04D 29/664* (2013.01); *F04D 29/667* (2013.01); *F01D 9/042* (2013.01); *F01D 25/24* (2013.01); *F05D 2220/36* (2013.01); *F05D 2260/14* (2013.01); *F05D 2260/96* (2013.01)

(58) Field of Classification Search
CPC .... F02K 3/06; F02C 7/04; F02C 7/045; F04D 29/526; F01D 25/24
See application file for complete search history.

(56) References Cited

U.S. PATENT DOCUMENTS

| | | | |
|---|---|---|---|
| 2,634,581 | A | 4/1953 | Kent |
| 2,663,993 | A | 12/1953 | Mosser |

(Continued)

FOREIGN PATENT DOCUMENTS

| | | |
|---|---|---|
| CN | 101922312 A | 12/2010 |
| FR | 1038694 A | 9/1953 |
| GB | 2403778 A | 1/2005 |

OTHER PUBLICATIONS

Willis, Quiet Clean Short-Haul Experimental Engine (QCSEE) Final Report, NASA-CR-159473, National Aeronautics and Space Administration, Contract NAS3-18021, QCSEE NASA Report NASA-CR-159473, Aug. 1979, 312 Pages.

*Primary Examiner* — Sabbir Hasan
*Assistant Examiner* — Wesley Le Fisher
(74) *Attorney, Agent, or Firm* — Dority & Manning, P.A.

(57) ABSTRACT

A gas turbine engine is provided having: a turbomachine; a fan rotatable by the turbomachine, the fan comprising a fan blade, the fan blade defining an outer tip along the radial direction, a trailing edge at the tip, and a length, $L_{FB}$, at the tip along the axial direction; and an outer nacelle surrounding the fan and surrounding at least in part the turbomachine, the outer nacelle comprising a stage of pre-swirl inlet guide vanes located upstream of the fan, the stage of pre-swirl inlet guide vanes having a pre-swirl inlet guide vane, the outer nacelle further comprising an inner surface along the radial direction and an acoustic treatment coupled to or integrated with the inner surface.

20 Claims, 15 Drawing Sheets

(51) Int. Cl.
   *F04D 29/52* (2006.01)
   *F04D 29/54* (2006.01)
   *F04D 29/66* (2006.01)

(56) References Cited

U.S. PATENT DOCUMENTS

| | | |
|---|---|---|
| 3,533,486 A | 10/1970 | Paulson |
| 3,540,682 A | 11/1970 | Dibble et al. |
| 3,575,259 A | 4/1971 | Wilkinson |
| 3,618,876 A | 11/1971 | Skidmore et al. |
| 3,664,612 A | 5/1972 | Skidmore et al. |
| 3,819,008 A * | 6/1974 | Evans .................. F02C 7/045 428/116 |
| 3,861,822 A | 1/1975 | Wanger |
| 3,981,466 A | 9/1976 | Shah |
| 4,254,619 A | 3/1981 | Griffin, III et al. |
| 4,688,745 A | 8/1987 | Rosenthal |
| 5,010,729 A | 4/1991 | Adamson et al. |
| 5,458,457 A | 10/1995 | Goto et al. |
| 6,409,469 B1 | 6/2002 | Tse |
| 6,431,820 B1 | 8/2002 | Beacock et al. |
| 6,457,938 B1 | 10/2002 | Liu et al. |
| 6,508,630 B2 | 1/2003 | Liu et al. |
| 6,540,477 B2 | 4/2003 | Glynn et al. |
| 6,546,734 B2 | 4/2003 | Antoine et al. |
| 6,585,482 B1 | 7/2003 | Liotta et al. |
| 6,619,916 B1 | 9/2003 | Capozzi et al. |
| 6,655,632 B1 | 12/2003 | Gupta et al. |
| 6,834,505 B2 | 12/2004 | Al-Roub et al. |
| 6,935,833 B2 | 8/2005 | Seitz |
| 7,025,565 B2 | 4/2006 | Urso et al. |
| 7,055,304 B2 | 6/2006 | Courtot et al. |
| 7,096,657 B2 | 8/2006 | Mahoney et al. |
| 7,210,900 B2 | 5/2007 | Urso et al. |
| 7,246,773 B2 | 7/2007 | Stoner et al. |
| 7,313,963 B2 | 1/2008 | Kuznar |
| 7,374,403 B2 | 5/2008 | Decker et al. |
| 7,374,404 B2 | 5/2008 | Schilling |
| 7,407,364 B2 | 8/2008 | Arnold et al. |
| 7,413,401 B2 | 8/2008 | Szucs et al. |
| 7,575,412 B2 * | 8/2009 | Seitz .................. F01D 5/145 415/58.7 |
| 7,789,620 B2 | 9/2010 | Vontell, Sr. et al. |
| 7,854,778 B2 | 12/2010 | Groom et al. |
| 7,871,244 B2 | 1/2011 | Marini et al. |
| 7,874,137 B2 | 1/2011 | Chaney et al. |
| 7,882,694 B2 | 2/2011 | Suciu et al. |
| 7,926,261 B2 | 4/2011 | Porte |
| 7,942,632 B2 | 5/2011 | Lord et al. |
| 7,955,046 B2 | 6/2011 | McCune et al. |
| 7,963,362 B2 | 6/2011 | Lidoine |
| 8,021,104 B2 | 9/2011 | Gu et al. |
| 8,105,042 B2 | 1/2012 | Parkin et al. |
| 8,186,942 B2 | 5/2012 | Haas |
| 8,226,360 B2 | 7/2012 | Scoggins et al. |
| 8,328,518 B2 | 12/2012 | Liang et al. |
| 8,348,600 B2 | 1/2013 | Norris et al. |
| 8,397,487 B2 | 3/2013 | Sennoun et al. |
| 8,419,374 B2 | 4/2013 | Huth et al. |
| 8,529,188 B2 | 9/2013 | Winter |
| 8,572,943 B1 | 11/2013 | Sheridan |
| 8,641,367 B2 | 2/2014 | Norris et al. |
| 8,677,764 B2 | 3/2014 | Porte |
| 8,689,538 B2 | 4/2014 | Sankrithi et al. |
| 8,690,519 B2 | 4/2014 | Aalburg et al. |
| 8,757,959 B2 | 6/2014 | Suciu et al. |
| 8,806,871 B2 | 8/2014 | McMasters et al. |
| 8,943,796 B2 | 2/2015 | McCaffrey |
| 9,003,808 B2 | 4/2015 | Kupratis |
| 9,039,364 B2 | 5/2015 | Alvanos et al. |
| 9,045,991 B2 | 6/2015 | Read et al. |
| 9,068,470 B2 | 6/2015 | Mills et al. |
| 9,074,483 B2 | 7/2015 | Breeze-Stringfellow et al. |
| 9,109,514 B2 | 8/2015 | Cheong |
| 9,114,877 B2 | 8/2015 | Weber et al. |
| 9,140,212 B2 | 9/2015 | Moon et al. |
| 9,206,697 B2 | 12/2015 | Tibbott et al. |
| 9,206,740 B2 | 12/2015 | Wong et al. |
| 9,228,497 B2 | 1/2016 | Ottow et al. |
| 9,239,005 B2 | 1/2016 | Strecker et al. |
| 9,249,736 B2 | 2/2016 | Carroll |
| 9,506,361 B2 | 11/2016 | Fielding et al. |
| 9,523,284 B2 | 12/2016 | Miller et al. |
| 9,540,094 B2 | 1/2017 | Negulescu et al. |
| 9,695,751 B2 | 7/2017 | Kupratis et al. |
| 9,784,134 B2 | 10/2017 | Eleftheriou |
| 9,797,261 B2 | 10/2017 | Tibbott et al. |
| 9,835,092 B2 | 12/2017 | Sawyers-Abbott et al. |
| 9,840,930 B2 | 12/2017 | Lee et al. |
| 9,863,256 B2 | 1/2018 | Lee et al. |
| 9,874,102 B2 | 1/2018 | Azad et al. |
| 9,874,109 B2 | 1/2018 | Hatcher, Jr. et al. |
| 9,879,599 B2 | 1/2018 | Mercier et al. |
| 9,945,247 B2 | 4/2018 | Appukuttan et al. |
| 9,957,918 B2 | 5/2018 | Suciu et al. |
| 9,995,167 B2 | 6/2018 | Shepard |
| 10,018,167 B2 | 7/2018 | Tentorio |
| 10,054,052 B2 | 8/2018 | Zheng et al. |
| 10,060,270 B2 | 8/2018 | Lee et al. |
| 10,060,351 B2 | 8/2018 | Oggero |
| 10,066,508 B2 | 9/2018 | Geiger |
| 10,100,733 B2 | 10/2018 | O'Toole et al. |
| 10,113,444 B2 | 10/2018 | Huang et al. |
| 10,131,443 B2 | 11/2018 | Namgoong |
| 10,145,301 B2 | 12/2018 | Abrari et al. |
| 10,173,780 B2 | 1/2019 | Mackin et al. |
| 10,184,340 B2 | 1/2019 | Baltas et al. |
| 10,189,572 B2 | 1/2019 | Mackin et al. |
| 10,196,895 B2 | 2/2019 | Weinert et al. |
| 10,196,901 B2 | 2/2019 | Wong et al. |
| 10,215,192 B2 | 2/2019 | Griffin |
| 10,239,626 B2 | 3/2019 | Herchenroder et al. |
| 10,240,526 B2 | 3/2019 | Suciu et al. |
| 10,252,790 B2 | 4/2019 | Ramakrishnan |
| 10,260,527 B2 | 4/2019 | Steen |
| 10,273,880 B2 | 4/2019 | Kolvick et al. |
| 10,288,010 B2 | 5/2019 | Houston et al. |
| 10,288,083 B2 | 5/2019 | Miller et al. |
| 10,344,711 B2 | 7/2019 | Hsu |
| 10,371,054 B2 | 8/2019 | Sasse et al. |
| 10,378,554 B2 * | 8/2019 | Yu .................. F02C 7/047 |
| 10,385,871 B2 | 8/2019 | Lurie et al. |
| 10,393,132 B2 | 8/2019 | Lee et al. |
| 10,399,664 B2 | 9/2019 | Bowden et al. |
| 10,415,409 B2 | 9/2019 | Oyarbide |
| 10,436,046 B2 | 10/2019 | Fentem et al. |
| 10,465,539 B2 * | 11/2019 | Duong .................. F04D 29/681 |
| 10,480,328 B2 | 11/2019 | Weaver et al. |
| 10,480,413 B2 | 11/2019 | Snyder |
| 10,502,232 B2 | 12/2019 | Mohtar et al. |
| 10,519,859 B2 | 12/2019 | Marchaj et al. |
| 10,557,415 B2 | 2/2020 | Boudebiza et al. |
| 10,563,513 B2 | 2/2020 | Kalitzin et al. |
| 10,634,059 B2 | 4/2020 | Rami et al. |
| 10,641,178 B2 | 5/2020 | Corrandini et al. |
| 10,690,146 B2 | 6/2020 | Urac et al. |
| 10,695,704 B2 | 6/2020 | Mook et al. |
| 10,711,797 B2 * | 7/2020 | Kroger .................. F04D 29/684 |
| 10,723,476 B2 | 7/2020 | Zaccardi et al. |
| 10,724,395 B2 | 7/2020 | Kupratis et al. |
| 10,724,435 B2 * | 7/2020 | Kroger .................. F04D 29/563 |
| 10,738,694 B1 | 8/2020 | Kupratis et al. |
| 10,787,909 B2 | 9/2020 | Hiernaux |
| 10,794,224 B2 | 10/2020 | Schiessl |
| 10,794,292 B2 | 10/2020 | Kupratis et al. |
| 10,794,395 B2 | 10/2020 | Tamada |
| 10,794,396 B2 * | 10/2020 | Kroger .................. F02C 7/04 |
| 10,801,442 B2 | 10/2020 | Clements et al. |
| 10,815,886 B2 * | 10/2020 | Kroger .................. F04D 29/541 |
| 10,816,208 B2 | 10/2020 | DiCintio et al. |
| 10,822,999 B2 | 11/2020 | Morris et al. |
| 10,823,114 B2 | 11/2020 | Clements et al. |
| 10,830,135 B2 | 11/2020 | Slawinska et al. |
| 10,837,361 B2 | 11/2020 | Abrari et al. |

(56) References Cited

U.S. PATENT DOCUMENTS

| | | | |
|---|---|---|---|
| 10,883,515 B2 | 1/2021 | Lurie et al. | |
| 10,961,864 B2 | 3/2021 | Miranda et al. | |
| 11,118,601 B2 | 9/2021 | Yu et al. | |
| 11,480,063 B1 | 10/2022 | Miller et al. | |
| 11,591,958 B2 * | 2/2023 | Meslioui | F02C 7/24 |
| 11,725,526 B1 | 8/2023 | Sibbach et al. | |
| 2001/0023582 A1 | 9/2001 | Nagel | |
| 2008/0041064 A1 | 2/2008 | Moore et al. | |
| 2008/0155959 A1 | 7/2008 | Rasheed et al. | |
| 2008/0155989 A1 | 7/2008 | Roth | |
| 2008/0232963 A1 | 9/2008 | Durocher et al. | |
| 2009/0155053 A1 | 6/2009 | Speak | |
| 2009/0155072 A1 | 6/2009 | Winter | |
| 2009/0245997 A1 | 10/2009 | Hurwitz et al. | |
| 2009/0255116 A1 | 10/2009 | McMasters et al. | |
| 2009/0272850 A1 | 11/2009 | Rainous et al. | |
| 2009/0277181 A1 | 11/2009 | Druon et al. | |
| 2009/0293445 A1 | 12/2009 | Ress, Jr. | |
| 2011/0044796 A1 | 2/2011 | Hussain et al. | |
| 2012/0240594 A1 | 9/2012 | Shamara | |
| 2012/0241561 A1 | 9/2012 | Shamara | |
| 2013/0192263 A1 | 8/2013 | Suciu et al. | |
| 2013/0319011 A1 | 12/2013 | Pescosolido et al. | |
| 2013/0323011 A1 | 12/2013 | Chopra et al. | |
| 2014/0020404 A1 | 1/2014 | Sheridan et al. | |
| 2014/0208755 A1 | 7/2014 | Ekanayake et al. | |
| 2014/0208768 A1 | 7/2014 | Bacic | |
| 2014/0318137 A1 | 10/2014 | McMasters et al. | |
| 2015/0198050 A1 | 7/2015 | Lee et al. | |
| 2015/0198163 A1 | 7/2015 | Lei et al. | |
| 2016/0003046 A1 | 1/2016 | Smith et al. | |
| 2016/0017751 A1 | 1/2016 | Caruel | |
| 2016/0047307 A1 | 2/2016 | Williamson et al. | |
| 2016/0047308 A1 | 2/2016 | Williamson et al. | |
| 2016/0047309 A1 | 2/2016 | Davidson et al. | |
| 2016/0047335 A1 | 2/2016 | Davidson et al. | |
| 2016/0084265 A1 | 3/2016 | Yu et al. | |
| 2016/0195010 A1 | 7/2016 | Roberge | |
| 2016/0298543 A1 | 10/2016 | Suciu et al. | |
| 2017/0030213 A1 | 2/2017 | Vlasic et al. | |
| 2017/0082028 A1 | 3/2017 | Duong et al. | |
| 2017/0138202 A1 | 5/2017 | Wadia et al. | |
| 2017/0146026 A1 | 5/2017 | Griffin | |
| 2017/0191372 A1 | 7/2017 | Tralshawala et al. | |
| 2017/0276018 A1 | 9/2017 | Bifulco et al. | |
| 2017/0284220 A1 | 10/2017 | Roberge | |
| 2017/0292532 A1 | 10/2017 | Wall | |
| 2017/0297728 A1 | 10/2017 | Niergarth et al. | |
| 2017/0298751 A1 | 10/2017 | Messmann et al. | |
| 2017/0314509 A1 | 11/2017 | Laricchiuta et al. | |
| 2018/0010617 A1 | 1/2018 | Casavant et al. | |
| 2018/0045059 A1 | 2/2018 | Lee et al. | |
| 2018/0112546 A1 | 4/2018 | Griffin | |
| 2018/0128179 A1 | 5/2018 | Staubach et al. | |
| 2018/0135432 A1 | 5/2018 | Martin, Jr. et al. | |
| 2018/0138766 A1 | 5/2018 | Moore et al. | |
| 2018/0138767 A1 | 5/2018 | Moore et al. | |
| 2018/0216527 A1 | 8/2018 | D'Angelo et al. | |
| 2018/0223733 A1 | 8/2018 | Zhang et al. | |
| 2018/0230944 A1 | 8/2018 | Suciu et al. | |
| 2018/0283183 A1 | 10/2018 | Gallier et al. | |
| 2018/0334916 A1 | 11/2018 | Lurie et al. | |
| 2018/0363554 A1 | 12/2018 | Kroger et al. | |
| 2018/0363675 A1 | 12/2018 | Kroger et al. | |
| 2018/0363676 A1 | 12/2018 | Kroger et al. | |
| 2018/0363677 A1 | 12/2018 | Kroger et al. | |
| 2018/0363678 A1 | 12/2018 | Kroger et al. | |
| 2019/0010868 A1 | 1/2019 | Davidson et al. | |
| 2019/0048798 A1 | 2/2019 | Slawinska et al. | |
| 2019/0063243 A1 | 2/2019 | Lemaire | |
| 2019/0107119 A1 | 4/2019 | Yu et al. | |
| 2019/0226402 A1 | 7/2019 | Kray et al. | |
| 2019/0284693 A1 | 9/2019 | Task | |
| 2019/0284940 A1 | 9/2019 | Task et al. | |
| 2019/0338707 A1 | 11/2019 | Beecroft et al. | |
| 2019/0368421 A1 | 12/2019 | Sweidan | |
| 2020/0025110 A1 | 1/2020 | Silkowski | |
| 2020/0049077 A1 | 2/2020 | Schwarz et al. | |
| 2020/0080432 A1 | 3/2020 | Filipenco | |
| 2020/0123918 A1 | 4/2020 | Duong et al. | |
| 2020/0141277 A1 | 5/2020 | Cooper et al. | |
| 2020/0149421 A1 | 5/2020 | Lad | |
| 2020/0165938 A1 | 5/2020 | Schreiber et al. | |
| 2020/0276641 A1 | 9/2020 | Benard et al. | |
| 2020/0284261 A1 | 9/2020 | Merchant et al. | |
| 2020/0300174 A1 | 9/2020 | Williamson et al. | |
| 2020/0316508 A1 | 10/2020 | Mook et al. | |
| 2020/0347737 A1 | 11/2020 | Bordoni | |
| 2021/0078715 A1 | 3/2021 | Bevirt et al. | |
| 2021/0087948 A1 | 3/2021 | Suciu | |
| 2021/0108597 A1 | 4/2021 | Ostdiek et al. | |
| 2023/0028503 A1 | 1/2023 | Sibbach et al. | |
| 2023/0053554 A1 | 2/2023 | Sibbach et al. | |
| 2023/0059995 A1 | 2/2023 | Geertsema et al. | |
| 2023/0060010 A1 | 2/2023 | Sibbach et al. | |
| 2023/0265862 A1 | 8/2023 | Sibbach et al. | |
| 2023/0279872 A1 | 9/2023 | Miller et al. | |
| 2023/0287837 A1 | 9/2023 | Sibbach et al. | |

* cited by examiner

OUTER NACELLE WITH INLET GUIDE VANES AND ACOUSTIC TREATMENT

FIELD

The present disclosure relates to a gas turbine engine.

BACKGROUND

A turbofan engine generally includes a fan having a plurality of fan blades and a turbomachine arranged in flow communication with one another. Additionally, the turbomachine of the turbofan engine generally includes, in serial order, a compressor section, a combustion section, a turbine section, and an exhaust section. In operation, air is provided from the fan to an inlet of the compressor section where one or more axial compressors progressively compress the air until the compressed air reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere. Efficiency losses in the fan may result in a less efficient turbofan engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
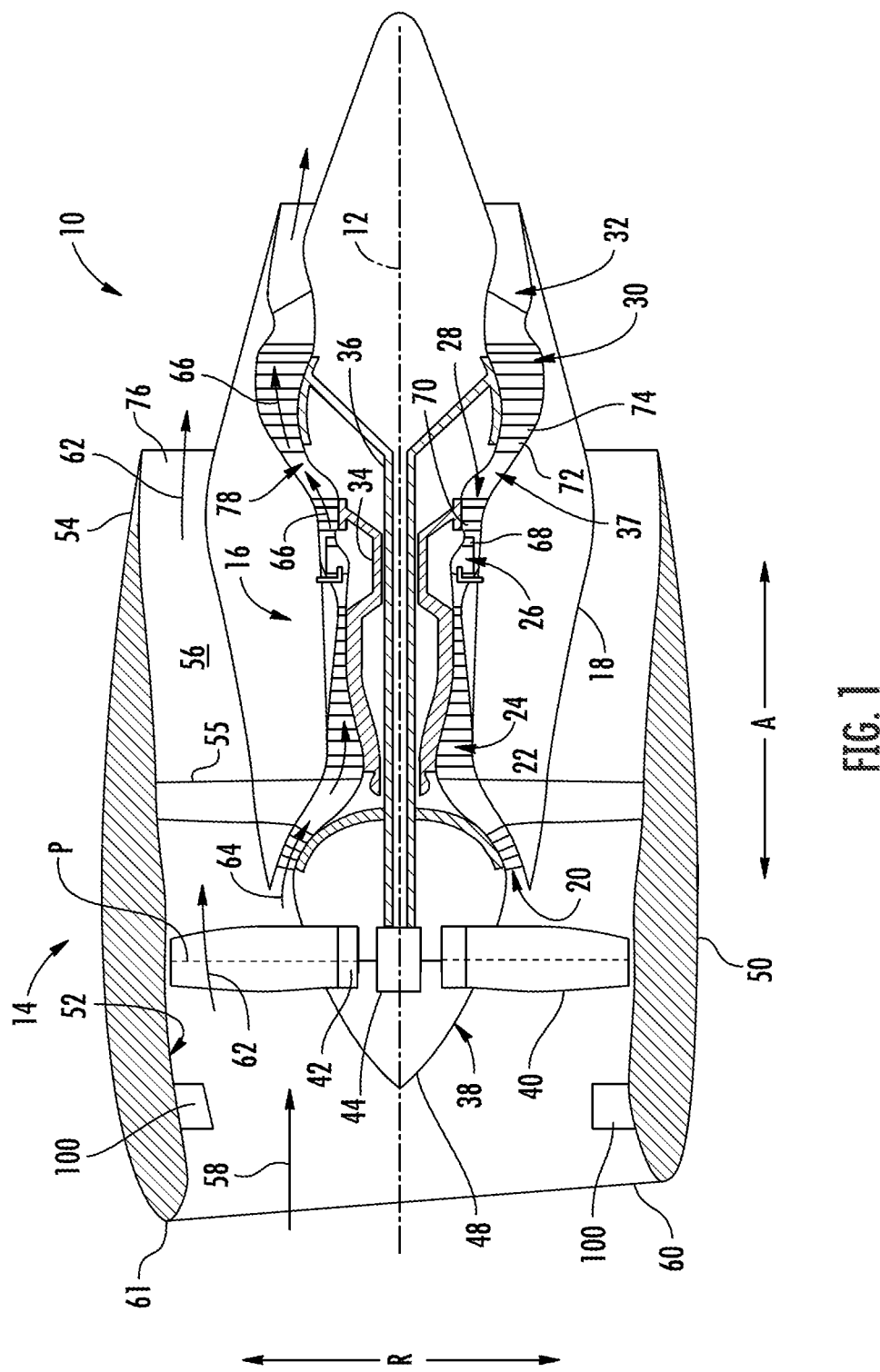
FIG. 1 is a cross-sectional view of an exemplary gas turbine engine.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For the purposes of the description, the terms "upper," "lower," "right," "left," "vertical," "horizontal," "top," "bottom," "lateral," "longitudinal," and derivatives thereof shall relate to the disclosure as oriented in the drawings.

As may be used herein, the terms "first," "second," "third," and other ordinals are used to distinguish one component from another and are not intended to signify location or importance of the individual components.

The terms "forward" and "aft" refer to relative positions within a gas turbine engine, with "forward" referring to a position closer to an engine inlet and "aft" referring to a position closer to an engine nozzle or exhaust.

The terms "upstream" and "downstream" refer to the relative direction with respect to fluid flow in a fluid pathway. For example, "upstream" refers to the direction from which fluid flows, and "downstream" refers to the direction to which the fluid flows.

The term "attached" refers to two components that are in direct connection with each other. The term "integrated" means either two components that are formed simultaneously as a single piece or two components that are formed separately and then later fixed to each other. The term "unitary structure" means a single piece structure formed monolithically such that components of the unitary structure are formed simultaneously.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The phrases "from X to Y" and "between X and Y" each refers to a range of values inclusive of the endpoints (i.e., refers to a range of values that includes both X and Y).

Generally, a gas turbine engine includes a fan and a turbomachine, with the turbomachine rotating the fan to generate thrust. The turbomachine includes a compressor section, a combustion section, a turbine section, and an exhaust section and defines a working gas flowpath therethrough. With a ducted gas turbine engine, the gas turbine engine further includes an outer nacelle surrounding the fan and at least a portion of the turbomachine.

Generally, an efficiency of a gas turbine engine may be increased by increasing a size of the fan. However, with larger fans, and particularly with larger fans in a direct drive gas turbine engine (a gas turbine engine without a reduction gearbox mechanically between a driving turbine and the fan), the tips of the fan blades of the fan may rotate at a relatively high speed. In such a manner, the fan may be referred to as a "high tip speed fan". In order to minimize airflow separation or other negative aerodynamic effects at the outer ends of the fan blades of a high tip speed fan, the inventors found that pre-swirl inlet guide vanes (IGVs) may be provided with the nacelle at a location upstream of the fan.

The inventors of the present disclosure sought out a means to incorporate pre-swirl IGVs, to result in a net gain towards achieving the above goals.

In particular, the inventors recognized that including the pre-swirl IGVs with the outer nacelle would allow for a direct-drive gas turbine engine to increase a diameter of the fan, while avoiding or reducing negative aerodynamic effects at the outer ends of the fan blades of the fan.

However, the inventors found that combining the pre-swirl IGVs with the larger fan created opportunity for increased noise as a result of the airflow pressure fluctuations associated with a fan blade passing frequency of the fan. The inventors found, unexpectedly, that including an acoustic treatment with the outer nacelle could, in some arrangements, provide for the benefits associated with including pre-swirl IGVs in a direct drive gas turbine engine with a larger fan/high tip speed fan without prohibitive noise increases.

In particular, the inventors discovered, unexpectedly, in the course of designing a gas turbine engine with a high tip speed fan, an outer nacelle with pre-swirl IGVs to accommodate the high tip speed fan, and an acoustic treatment to address an increase in noise generation, that the costs associated with inclusion of the high tip speed fan and outer nacelle with pre-swirl IGVs (e.g., noise) are overcome by the gas turbine engine efficiency benefits in at least certain designs, contrary to previous thinking and expectations. In particular, the inventors discovered during the course of designing several gas turbine engines having a high tip speed fan and an outer nacelle with pre-swirl IGVs and an acoustic treatment of varying thrust classes and with varying fan sizes/fan tip speeds (including the configurations illustrated and described in detail herein), a relationship exists among a fan blade and pre-swirl inlet guide vane separation and an acoustic treatment length, whereby including a high tip speed fan and an outer nacelle with pre-swirl IGVs and an acoustic treatment in accordance with one or more of the exemplary aspects described herein results in a net benefit to the overall engine design.

With a goal of arriving at an improved gas turbine engine capable of providing the desired aerodynamic efficiency gains associated with operating the fan at higher speeds, the inventors proceeded in the manner of designing gas turbine engines having an outer nacelle with pre-swirl IGVs and an acoustic treatment incorporated therewith with various fan blade and pre-swirl inlet guide vane separations and acoustic treatment lengths; checking an operability and aerodynamic efficiency characteristics of the designed gas turbine engines; redesigning the gas turbine engines to vary the noted parameters based on the impact on other aspects of the gas turbine engines; rechecking the operability and aerodynamic efficiency characteristics of the redesigned gas turbine engines; etc. during the design of several different types of outer nacelles with pre-swirl IGVs and acoustic treatments incorporated therewith, including the outer nacelles described herein, which are described below in greater detail.

Referring now to the drawings, wherein identical numerals indicate the same elements throughout the figures, FIG. 1 is a cross-sectional view of a gas turbine engine in accordance with an exemplary embodiment of the present disclosure. More particularly, for the embodiment of FIG. 1, the gas turbine engine is an aeronautical, turbofan jet engine, referred to herein as "turbofan engine 10." The turbofan engine 10 is configured to be mounted to an aircraft, such as in an under-wing configuration or a tail-mounted configuration. As shown in FIG. 1, the turbofan engine 10 defines an axial direction A (extending parallel to a longitudinal centerline provided for reference), a radial direction R, and a circumferential direction (e.g., a direction extending about the axial direction A). The longitudinal centerline defines a longitudinal centerline 12 of the turbofan engine 10. In general, the turbofan engine 10 includes a fan section 14 and a turbomachine 16 disposed downstream from the fan section 14 (the turbomachine 16 sometimes also, or alternatively, referred to as a "core turbine engine").

The exemplary turbomachine 16 depicted generally includes a substantially tubular outer casing 18 that defines an annular inlet 20. The outer casing 18 encases, in serial flow relationship, a compressor section including a first, booster or low pressure (LP) compressor 22 and a second, high pressure (HP) compressor 24; a combustion section 26; a turbine section including a first, high pressure (HP) turbine 28 and a second, low pressure (LP) turbine 30; and a jet exhaust nozzle section 32. A high pressure (HP) shaft drivingly connects the HP turbine 28 to the HP compressor 24. A low pressure (LP) shaft 36 drivingly connects the LP turbine 30 to the LP compressor 22. The compressor section, combustion section 26, turbine section, and jet exhaust nozzle section 32 are arranged in serial flow order and together define a core air flowpath 37 through the turbomachine 16. It is also contemplated that the present disclosure is compatible with an engine having an intermediate pressure turbine, e.g., an engine having three spools.

Referring still to the embodiment of FIG. 1, the fan section 14 includes a variable pitch, single stage fan 38, the turbomachine 16 operably coupled to the fan 38 for driving the fan 38. The fan 38 includes a plurality of rotatable fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40, e.g., in unison. The fan blades 40, disk 42, and actuation member 44 are together rotatable about the longitudinal centerline 12 by the LP shaft 36. Notably, in the embodiment shown, the fan 38 and the fan blades 40 are rotatable by the LP shaft 36 through a 1:1 mechanical connection (i.e., without a reduction gearbox or other speed change mechanism). Accordingly, it will be appreciated that the exemplary turbofan engine 10 depicted is configured as a direct-drive gas turbine engine.

In exemplary embodiments, the fan section 14 includes twenty-two (22) or fewer fan blades 40. In other exemplary embodiments, the fan section 14 includes a different number of fan blades 40, such as twenty (20), eighteen (18), sixteen (16), or other numbers of fan blades 40.

Referring still to the exemplary embodiment of FIG. 1, the disk 42 is covered by a rotatable front nacelle or hub 48 aerodynamically contoured to promote an airflow through the plurality of fan blades 40. Additionally, the exemplary fan section 14 includes an annular fan casing or outer nacelle 50 that at least partially (and for the embodiment depicted, circumferentially) surrounds the fan 38 and at least a portion of the turbomachine 16.

More specifically, the outer nacelle 50 includes an inner wall 52 (defining an inner surface; not separately labeled) and a downstream section 54 of the inner wall 52 of the outer nacelle 50 extends over an outer portion of the turbomachine 16 so as to define a bypass airflow passage 56 therebetween. Additionally, for the embodiment depicted, the outer nacelle 50 is supported relative to the turbomachine 16 by a plurality of circumferentially spaced outlet guide vanes 55. The outer nacelle 50 includes an inlet 60 at a leading edge 61 of the outer nacelle 50.

During operation of the turbofan engine 10, a volume of air 58 enters the turbofan engine 10 through the inlet 60 of the outer nacelle 50 and/or the fan section 14. As the volume of air 58 passes cross the fan blades 40, a first portion of the air 58 as indicated by arrow 62 is directed or routed into the bypass airflow passage 56, and a second portion of the air 58 as indicated by arrow 64 is directed or routed into the core air flowpath 37. The pressure of the second portion of air indicated by the arrow 64 is then increased as it is routed through the HP compressor 24 and into the combustion section 26, where it is mixed with fuel and burned to provide combustion gases 66. The combustion gases 66 are routed from the combustion section 26 through the HP turbine 28. In the HP turbine 28, a portion of thermal and/or kinetic energy from the combustion gases 66 is extracted via sequential stages of HP turbine stator vanes 68 that are coupled to the outer casing 18 and HP turbine rotor blades 70 that are coupled to a high pressure (HP) shaft 34, thus causing the HP shaft 34 to rotate, thereby supporting operation of the HP compressor 24. The combustion gases 66 are then routed through the LP turbine 30 where a second portion of thermal and/or kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust.

Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the turbomachine 16.

In some exemplary embodiments, the exemplary turbofan engine 10 of the present disclosure may be a relatively large power class turbofan engine 10. Accordingly, when operated at the rated speed, the turbofan engine 10 may be configured to generate a relatively large amount of thrust. More specifically, when operated at the rated speed, the turbofan engine 10 may be configured to generate at least 20,000 pounds of thrust, such as at least about 25,000, 30,000, and up to, e.g., 150,000 pounds of thrust. Accordingly, the turbofan engine 10 may be referred to as a relatively large power class gas turbine engine.

Referring still to FIG. 1, and as previously discussed, the exemplary turbofan engine 10 depicted in FIG. 1 is configured as a direct drive turbofan engine 10, however other configurations are also contemplated. For example, a geared configuration of the turbofan engine 10 could be implemented, where a reduction gear ratio can be selected to maintain high rotational speed operation of the fan 38.

However, still referring to the direct drive turbofan engine 10, the interplay of the fan 38 and power generation components in the turbomachine 16 with relative speeds fixed relative to one another should be considered. In order to increase an efficiency of the turbomachine 16, the LP turbine 30 is configured to rotate a relatively high rotational speed. Given the direct-drive configuration, this relatively high speed rotation of the turbomachine 16 also causes the plurality of fan blades 40 of the fan 38 to rotate at a relatively high rotational speed. For example, during operation of the turbofan engine 10 at the rated speed, the fan tip speed of each of the plurality of fan blades 40 is greater than 1,250 feet per second. In certain exemplary embodiments, during operation of the turbofan engine 10 at the rated speed, the fan tip speed of each of the plurality of fan blades 40 may be greater than 1,350 feet per second, such as greater than 1,450 feet per second, such as greater than 1,550 feet per second, such as up to 2,200 feet per second.

Despite these relatively high fan tip speeds, the fan 38 is nevertheless designed to define a relatively low fan pressure ratio. For example, during operation of the turbofan engine 10 at the rated speed, the fan pressure ratio of the fan 38 is greater than 1.0 and less than 1.5. For example, during operation of the turbofan engine 10 at the rated speed, the fan pressure ratio may be between about 1.15 and about 1.5, such as between about 1.25 and about 1.4.

As will be appreciated, operating a high speed turbofan engine 10 in such a manner may ordinarily lead to efficiency penalties of the fan 38 due to shock losses and flow separation, especially at the outer tips of the plurality of fan blades 40 of the fan 38 along the radial direction R. Accordingly, as will be described in greater detail below, the turbofan engine 10 further includes one or more inlet pre-swirl features 80 upstream of the plurality of fan blades 40 of the fan 38 to offset or minimize such efficiency penalties of the fan 38. With the inclusion of such inlet pre-swirl features, the efficiency gains of the turbomachine 16 due to, e.g., increased rotational speeds of the LP turbine 30, can outweigh the above identified potential efficiency penalties.

Figure 2:
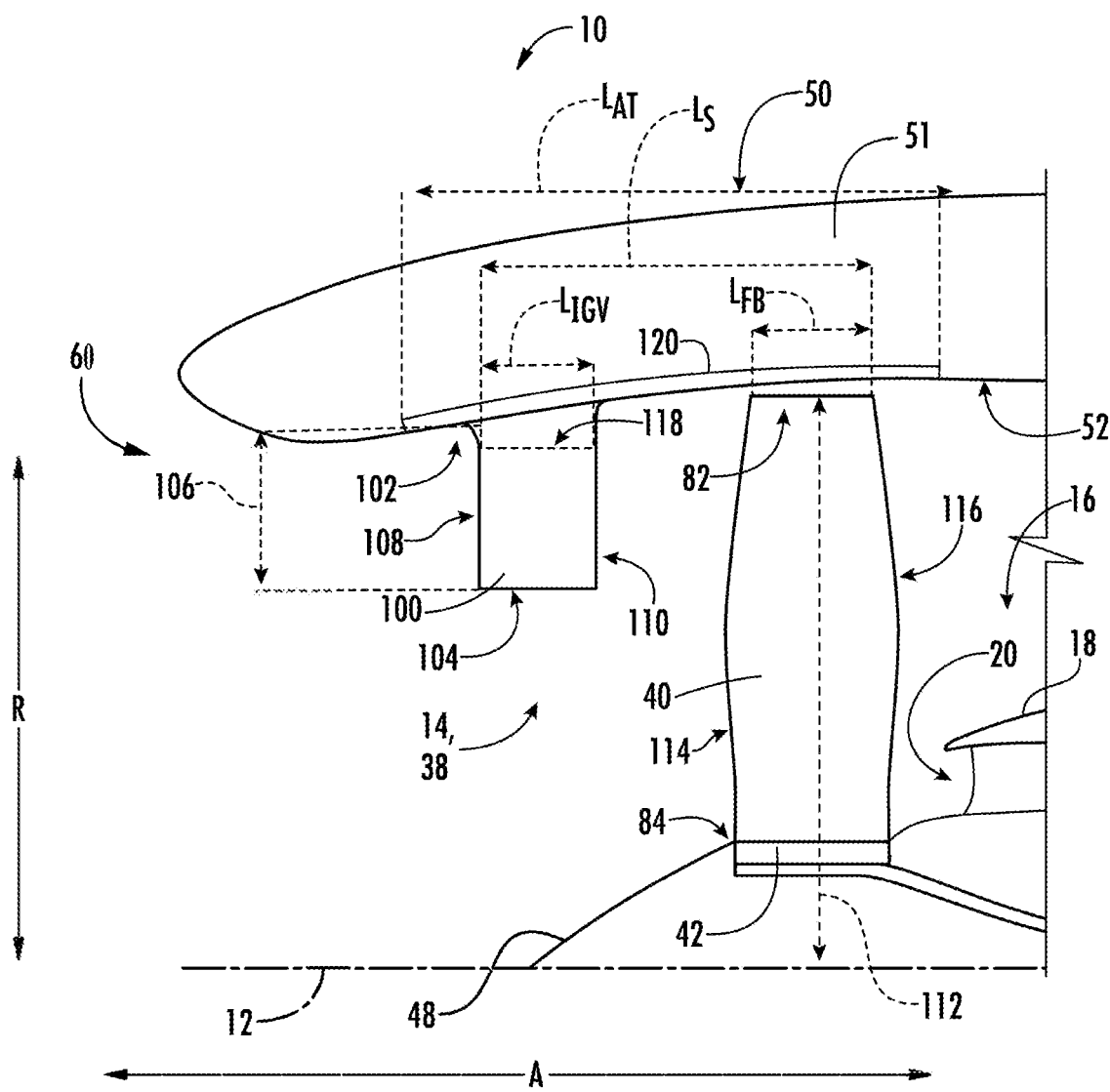
FIG. 2 is a magnified view of a forward end of the exemplary gas turbine engine of FIG. 1 illustrating a guide vane assembly.

Referring now also to FIG. 2, a close-up, cross-sectional view of the fan section 14 and forward end of the turbomachine 16 of the exemplary turbofan engine 10 of FIG. 1 is provided. As stated, the turbofan engine 10 includes a pre-swirl inlet guide vane 100, and more specifically includes a stage of pre-swirl inlet guide vanes 100. The stage of pre-swirl inlet guide vanes 100 is located upstream of the plurality of fan blades 40 of the fan 38 and attached to or integrated into a body 51 of the nacelle 50.

More specifically, for the embodiment of FIGS. 1 and 2, each of the plurality of pre-swirl inlet guide vanes is a part-span inlet guide vane cantilevered from the body 51 of the nacelle 50 at a location forward of the plurality of fan blades 40 of the fan 38 along the axial direction A. In this configuration, each of the plurality of pre-swirl inlet guide vanes 100 defines a base 102 (see FIG. 2) along the radial direction R, and is attached or connected to the body 51 of the nacelle 50 at the base 102. For example, each of the inlet pre-swirl features 80 may be bolted to the body 51 of the nacelle 50 at the base 102, welded to the body 51 of the nacelle 50 of the base 102, or attached to the body 51 of the nacelle 50 in any other suitable manner at the base 102.

Further, for the embodiment depicted, each of the plurality of pre-swirl inlet guide vanes 100 extends generally along the radial direction R from its respective base 102 to a respective tip 104 generally along the radial direction R. Moreover, as will be appreciated, for the embodiment depicted, each of the plurality of pre-swirl inlet guide vanes 100 is unconnected with an adjacent one of the plurality of pre-swirl inlet guide vanes 100 at its respective tip 104. More specifically, for the embodiment depicted, each pre-swirl inlet guide vanes 100 is completely supported by its connection to or integration with the body 51 of the nacelle 50 at the respective base 102 (and not through any structure extending, e.g., between adjacent inlet pre-swirl features at a location inward of the outer end along the radial direction R).

As depicted in FIG. 2, each of the plurality of pre-swirl inlet guide vanes 100 does not extend completely between the nacelle 50 and, e.g., the hub 48. More specifically, for the embodiment depicted, each of the plurality of pre-swirl inlet guide vanes 100 defines a pre-swirl feature span 106 along the radial direction R. More specifically, each of the plurality of pre-swirl inlet guide vanes 100 further defines a leading edge 108 and a trailing edge 110, where the pre-swirl feature span 106 refers to a measure along the radial direction R between the base 102 and the tip 104 of the pre-swirl feature 80 at the leading edge 108 of the pre-swirl feature 80. Similarly, it will be appreciated that each of the plurality of fan blades 40 of the fan 38 defines a fan blade span 112 along the radial direction R. More specifically, each of the plurality of fan blades 40 of the fan 38 defines a leading edge 114 and a trailing edge 116, where the fan blade span 112 refers to a measure along the radial direction R between a radially outer tip 82 and a base 84 of the fan blade 40 at the leading edge 114 of the respective fan blade 40.

For the embodiment depicted, the pre-swirl feature span 106 is at least about five percent of the fan blade span 112 and up to about fifty five percent of the fan blade span 112. For example, in certain exemplary embodiments, the pre-swirl feature span 106 may be between about fifteen percent of the fan blade span 112 and about forty five percent of the fan blade span 112, for example between about thirty percent of the fan blade span 112 and about forty percent of the fan blade span 112.

Although not depicted, in certain exemplary embodiments, the number of the plurality of pre-swirl inlet guide vanes 100 may be substantially equal to the number of fan blades 40 of the fan 38 of the turbofan engine 10. In other embodiments, however, the number of the plurality of pre-swirl inlet guide vanes 100 may be greater than the number of fan blades 40 of the fan 38 of the turbofan engine 10, or alternatively, may be less than the number of fan blades 40 of the fan 38 of the turbofan engine 10.

Further, it should be appreciated, that in other exemplary embodiments, the turbofan engine 10 may include any other suitable number of inlet pre-swirl features 80 and/or circumferential spacing of inlet pre-swirl features 80. For example, the turbofan engine 10 may include fewer than fifty and at least eight inlet pre-swirl features 80.

Figure 3:
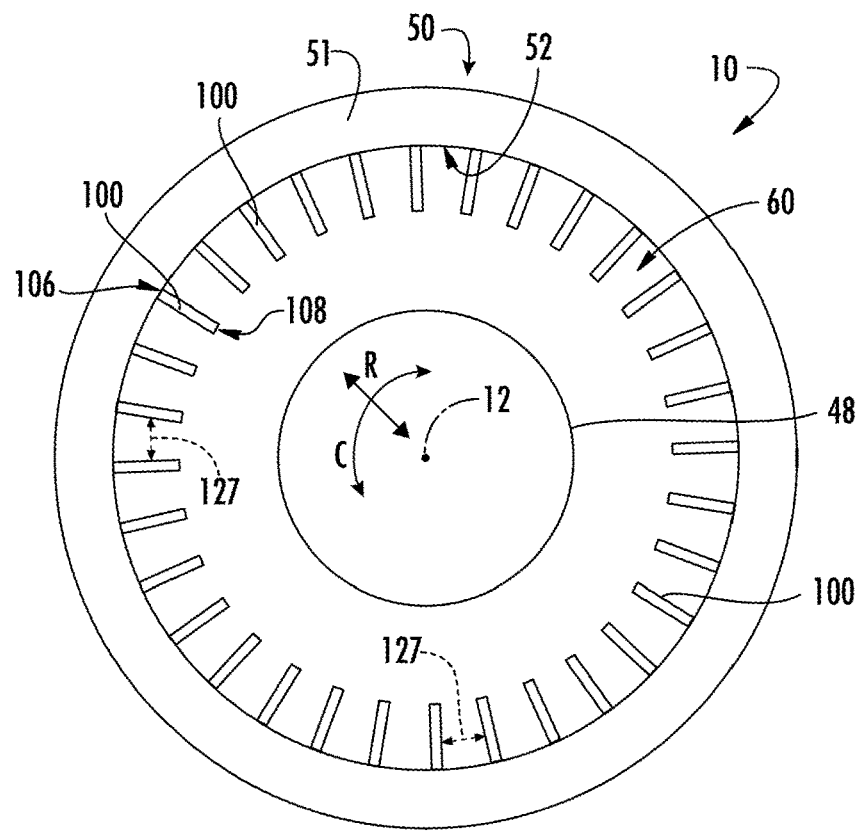
FIG. 3 is an axial view of an inlet to the exemplary gas turbine engine of FIG. 1 with a plurality of evenly-spaced guide vane assemblies.

Additionally, referring briefly to FIG. 3, providing an axial view of the inlet 60 of the turbofan engine 10 of FIGS. 1 and 2, the plurality of pre-swirl inlet guide vanes 100 includes a plurality of pre-swirl inlet guide vanes 100 arranged circumferentially around the nacelle 50. More specifically, the number of pre-swirl inlet guide vanes 100 shown in FIG. 3 is from about ten pre-swirl inlet guide vanes 100 to about fifty pre-swirl inlet guide vanes 100. The plurality of pre-swirl inlet guide vanes 100 are arranged substantially evenly along a circumferential direction C. More specifically, each of the plurality of pre-swirl inlet guide vanes 100 defines a circumferential spacing 127 with an adjacent pre-swirl inlet guide vane 100, and each of the circumferential spacings 127 are substantially equal to each other of the circumferential spacings 127.

It should be understood, however, that in other exemplary embodiments, the plurality of pre-swirl inlet guide vanes 100 may be unevenly spaced along the circumferential direction C.

Still referring to the embodiment of FIG. 2, it will be appreciated that each of the plurality of pre-swirl inlet guide vanes 100 is configured to pre-swirl the air 58 provided through the inlet 60 of the nacelle 50, upstream of the plurality of fan blades 40 of the fan 38. As described above, pre-swirling the air 58 provided through the inlet 60 of the nacelle 50 prior such air 58 reaching the plurality of fan blades 40 of the fan 38 may reduce separation losses and/or shock losses, allowing the fan 38 to operate with the relatively high fan tip speeds described above with minimal losses in efficiency.

The inventors found several aspects of the pre-swirl inlet guide vanes 100 and fan blades 40 that affect operation and efficiency of the turbofan engine 10. For example, as is depicted in FIG. 2, the fan blade 40 includes the leading edge 114 and the trailing edge 116, and the tip 82 along the radial direction R. The fan blade 40 further defines a length, $L_{FB}$, at the tip 82 along the axial direction A from the leading edge 114 to the trailing edge 116.

Similarly, the pre-swirl inlet guide vane 100 depicted, of the plurality of pre-swirl inlet guide vanes 100, defines a 15% span location 118 (with 0% span located at the base 102 and 100% span located at the tip 104). Said another way, the 15% span location 118 represents a location that is 15% of the distance traversed from the base 102 to the tip 104. The pre-swirl inlet guide vane 100 defines a length, $L_{IGV}$, along the axial direction A at the 15% span location 118.

Moreover, the turbofan engine 10 defines a length, $L_S$, along the axial direction A from the leading edge 108 of the pre-swirl inlet guide vane 100 at the 15% span location 118 to the trailing edge 116 of the fan blade 40 at the tip of the fan blade 40.

Further, it will be appreciated from the description herein that while inclusion of the plurality of pre-swirl inlet guide vanes 100 provides efficiencies the exemplary turbofan engine 10 depicted, positioning the plurality of pre-swirl inlet guide vanes 100 at the location upstream of the fan blades 40 of the fan 38 creates an opportunity for increased noise as a result of airflow pressure fluctuations associated with a passing frequency of the fan blades 40 of the fan 38. In order to avoid prohibitive noise generation as a result of the inclusion of the pre-swirl inlet guide vanes 100, the exemplary turbofan engine 10 depicted, and more specifically the outer nacelle 50 of the turbofan engine 10 depicted further includes an acoustic treatment 120. The inventors found, unexpectedly, that including the acoustic treatment 120 with the outer nacelle 50 could, in some arrangements, provide for the benefits associated with including pre-swirl inlet guide vanes 100 in a turbofan engine 10 of the present disclosure without prohibitive noise increases.

As used herein, the term "acoustic treatment" refers to any material or system applied to or integrated onto the inner wall 52 of the outer nacelle 50, designed or selected for its properties to absorb, dissipate, or reduce the transmission of sound energy. The term acoustic treatment encompasses materials, structures, composites, and combinations thereof that can attenuate airborne noise, structure-borne vibration, or any combination thereof, thereby mitigating noise emanation from one or more aspects of the engine. The term includes, but is not limited to, porous materials, foam-based materials, damping materials, and structures or devices that exhibit sound-absorbing characteristics or alter the acoustic environment to reduce noise perception effectively (including the structures described below with reference to FIGS. 5 through 8).

Figure 4:
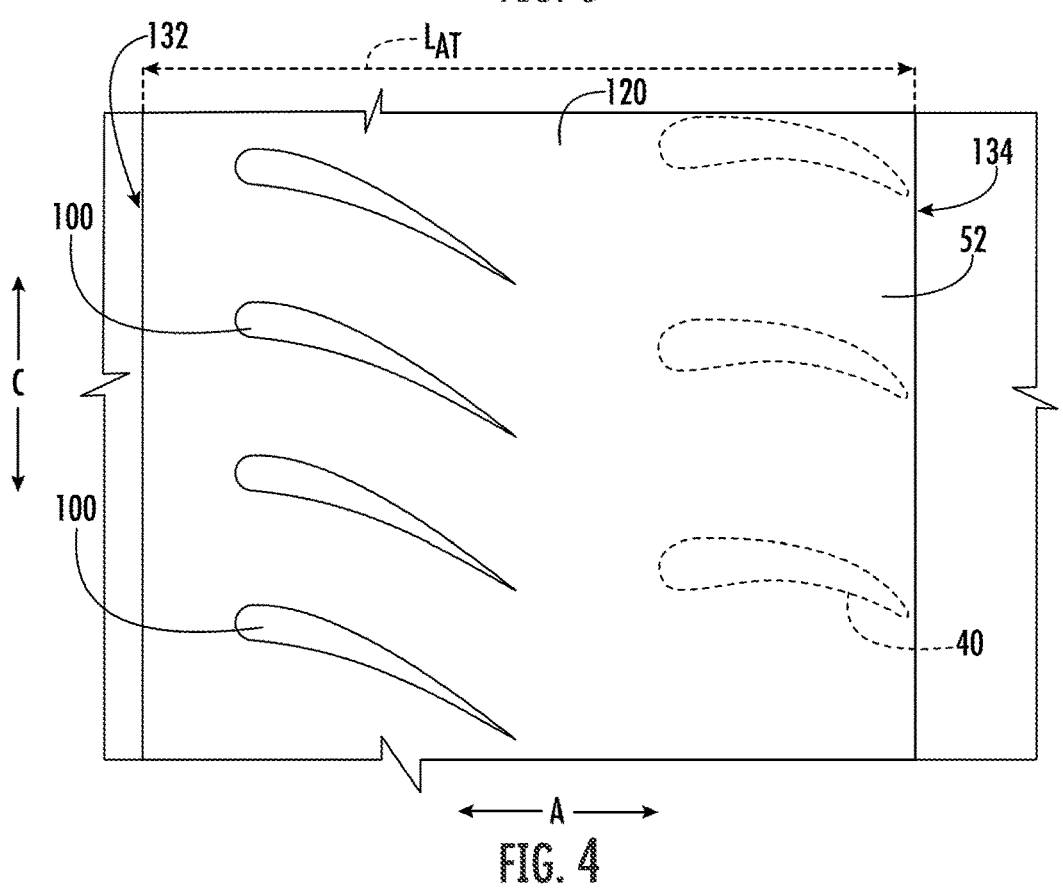
FIG. 4 is a plan view of an inner wall of an outer nacelle of the exemplary gas turbine engine of FIGS. 1 through 3.

In particular, referring now also to FIG. 4, providing a plan view of the inner wall 52 of the outer nacelle 50 of FIGS. 1 through 3, with the stage of pre-swirl inlet guide vanes 100 arranged along the circumferential direction C, the acoustic treatment 120 of the outer nacelle 50 is depicted. The acoustic treatment 120, in the embodiment depicted, extends from a forward end 132 to an aft end 134, with the forward end 132 being positioned forward of the stage of pre-swirl inlet guide vanes 100 and the aft end 134 being positioned aft of the plurality of fan blades 40 of the fan (depicted in phantom in FIG. 4). The acoustic treatment 120 defines a length, $L_{AT}$, along the axial direction A from the forward end 132 to the aft end 134.

In such a manner, for the exemplary embodiment depicted, the acoustic treatment 120 is positioned along the axial direction A at least between the stage of pre-swirl inlet guide vanes 100 and the tip 82 of the fan blade 40, and further is positioned along the axial direction A at partially at the stage of pre-swirl inlet guide vanes 100 and is positioned along the axial direction A at least partially at the tip 82 of the fan blade 40. It will be appreciated, that as used in this context, that the term "at" refers to a first component (e.g., the acoustic treatment 120) having at least a portion overlapping along the axial direction A with at least a portion of the second component (e.g., the pre-swirl inlet guide vanes 100 or tips 82 of the fan blades 40).

Moreover, referring still to FIG. 4, it will be appreciated that the exemplary acoustic treatment 120 extends continuously along a circumference of the inner wall 52 of the outer nacelle 50 (e.g., continuously in the circumferential direction C).

Figure 5:
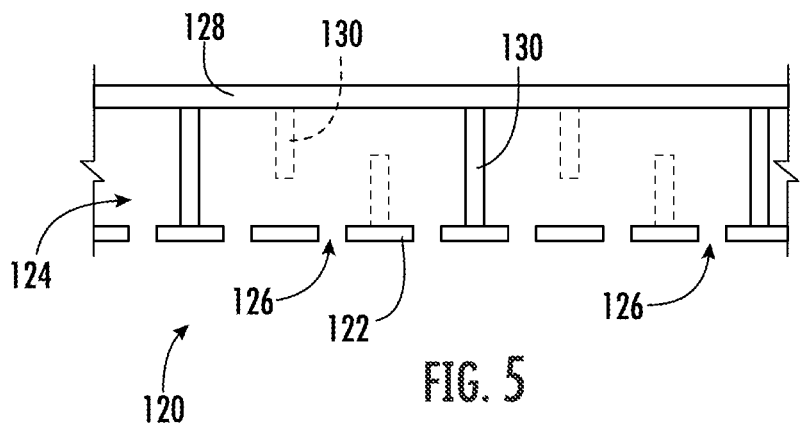
FIG. 5 is a schematic view of an acoustic treatment in accordance with an exemplary aspect of the present disclosure.

In at least certain exemplary embodiments, the acoustic treatment 120 may include a perforated sheet 122 with a hollow body 124. In particular, referring now to FIG. 5, a schematic, cross-sectional view is provided of an acoustic treatment 120 in accordance with an exemplary aspect of the present disclosure. As shown in the embodiment of FIG. 5, the exemplary acoustic treatment 120 includes the perforated sheet 122 and the hollow body 124. The hollow body 124 includes a liner 128 defining an interior void adjacent to the perforated sheet 122. The perforated sheet 122 defines a plurality of openings 126 allowing an external environment to communicate with the interior void of the hollow body 124. Acoustic waves may enter the hollow body 124 through the plurality of openings 126, allowing for an attenuation of the noise generated by virtue of the orientation of the outlet guide vanes 55 in the forward swept arrangement.

The perforated sheet 122 is coupled to the liner 128 through a plurality of extensions 130 extending from the perforated sheet 122 to the liner 128. In certain exemplary embodiments, the acoustic treatment 120 may further include additional structures to increase noise attenuation achieved by the acoustic treatment 120 at desired frequencies. The additional structures may be walls or other extensions 130 (depicted in phantom) extending from the perforated sheet 122, extending from the liner 128, or both; may be perforations in the walls or extensions 130; may be additional or alternative walls or extensions 130; etc.

Figure 6:
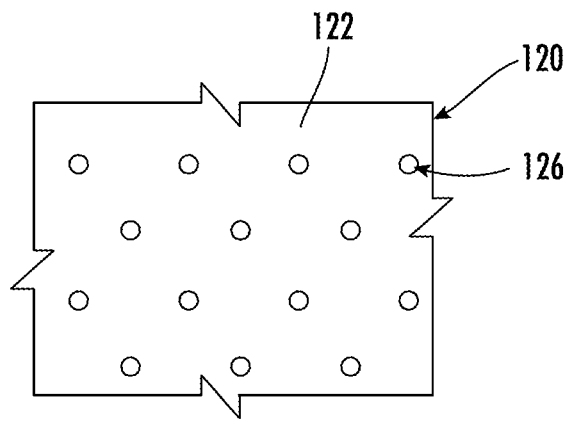
FIG. 6 is a schematic view of an acoustic treatment in accordance with another exemplary aspect of the present disclosure.

Referring now to FIG. 6, a schematic, a top view is provided of a perforated sheet 122 in accordance with an exemplary aspect of the present disclosure. The perforated sheet 122 may include a plurality of openings 126 spaced in a uniform manner.

Figure 7:
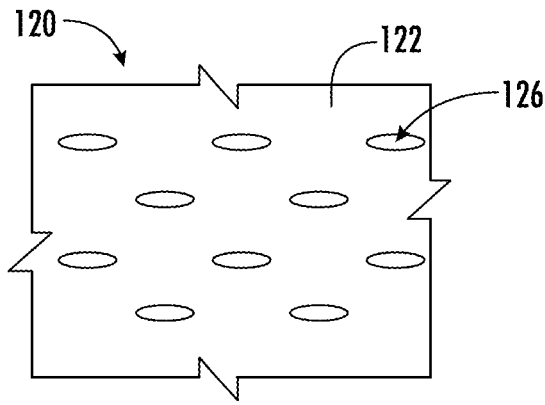
FIG. 7 is a schematic view of an acoustic treatment in accordance with yet another exemplary aspect of the present disclosure.

Referring now to FIG. 7, a schematic, a top view is provided of a perforated sheet 122 accordance with another exemplary aspect of the present disclosure. As will be appreciated from the view of FIG. 7, the plurality of openings 126 of the perforated sheet 122 may define a noncircular shape, such as an elongated or ovular shape.

Figure 8:
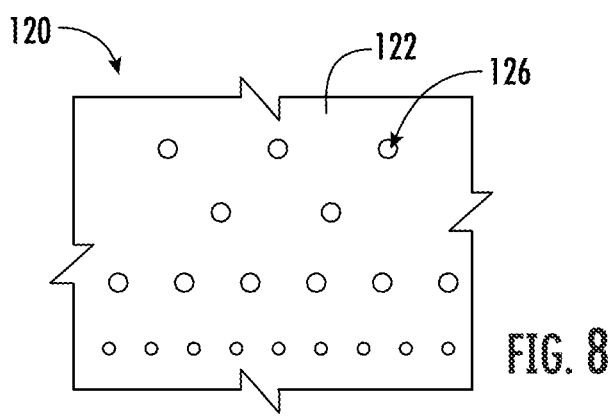
FIG. 8 is a schematic view of an acoustic treatment in accordance with still another exemplary aspect of the present disclosure.

Referring now to FIG. 8, a schematic, a top view is provided of a perforated sheet 122 in accordance with yet another exemplary embodiment of the present disclosure. As will be appreciated from the view of FIG. 8, the plurality of openings 126 may define a nonuniform size and a nonuniform spacing. Such a configuration may, e.g., allow for the acoustic treatment 120 to target noise at various frequencies.

As alluded to earlier, the inventors discovered, unexpectedly during the course of designing gas turbine engines having a high tip speed fan and outer nacelle with pre-swirl IGVs and acoustic treatment—i.e., designing gas turbine engines having high tip speed fans and outer nacelles with pre-swirl IGVs and acoustic treatments, and evaluating overall engine and aerodynamic efficiency performances—a significant relationship between the fan blade and pre-swirl inlet guide vane separation and an acoustic treatment length. The relationship can be thought of as an indicator of the ability of a gas turbine having a high tip speed fan and an outer nacelle with pre-swirl IGVs and an acoustic treatment to be able achieve the aerodynamic performance improvement at the outer ends of the fan blades during high speed operation, without having a prohibitive increase in noise generation.

The relationship applies to a gas turbine engine having an outer nacelle with pre-swirl IGVs and an acoustic treatment, e.g., integrated with an inner surface of the outer nacelle. The relationship ties together a fan blade tip length, a pre-swirl inlet guide vane length, a fan blade and pre-swirl inlet guide vane separation, and an acoustic treatment length, as described in more detail below.

In particular, the inventors discovered that inclusion while including pre-swirl IGVs upstream of a high tip speed fan may alleviate aerodynamic issues with at an outer end of the fan, the pre-swirl IGVs interact with fluctuations in pressure from the fan blades as a result of the rotation and passing of the fan blades at a blade passing frequency. The inventors found that a magnitude of the pressure fluctuations relates to an axial length of the tips of the fan blades (a fan blade tip length), with higher fan blade tip lengths resulting high magnitude pressure fluctuations.

Further, the inventors found that an axial length of the pre-swirl inlet guide vanes, a pre-swirl inlet guide vane length, affects the level of interaction with the pressure fluctuations, with higher pre-swirl inlet guide vane lengths resulting in greater interaction (and more noise generation).

Similarly, the inventors found that an axial separation between a fan blade trailing edge and a pre-swirl inlet guide vane leading edge, a fan blade and pre-swirl inlet guide vane separation, also affects the level of interaction with the pressure fluctuations, with lower fan blade and pre-swirl inlet guide vane separation resulting in greater interaction (and more noise generation).

Moreover, the inventors found that an amount of acoustic treatment, and more specifically a length of the acoustic treatment, of the outer nacelle affected a level of noise attenuation achieved by the acoustic treatment, with longer acoustic treatments resulting in greater noise attenuation. However, with an increase in length of the acoustic treatment comes an increase in cost for manufacturing the part, and further the acoustic attenuation benefits have decreasing returns.

The discovered relationship, infra, can therefore identify a gas turbine engine with high tip speed fan and an outer nacelle with pre-swirl IGVs and an acoustic treatment capable of achieving a desired aerodynamic efficiency gain associated with operating the fan at higher speeds, while avoiding a prohibitive increases in noise generation, and suited for a particular mission requirement, one that takes into account efficiency, weight, noise, complexity, reliability, and other factors influencing the optimal choice for a gas turbine engine with a high tip speed fan and an outer nacelle with pre-swirl IGVs and an acoustic treatment.

In addition to yielding an improved gas turbine engine with the above-noted features, as explained in detail above, utilizing this relationship, the inventors found that the number of suitable or feasible gas turbine engine designs capable of meeting the above design requirements could be greatly diminished, thereby facilitating a more rapid down selection of designs to consider as a gas turbine engine (with a high tip speed fan and an outer nacelle with pre-swirl IGVs and an acoustic treatment) being developed. Such a benefit provides more insight to the requirements for a given gas turbine engine well before specific technologies, integration and system requirements are developed fully. Such a benefit avoids late-stage redesign.

The desired relationship providing for the improved gas turbine engine, discovered by the inventors, provides bounds to a length, $L_{AT}$, along an axial direction of the acoustic treatment. In particular, the relationship is set forth as follows:

$$(L_{IGV}^2/L_S) \times UCF_1 < L_{AT} < (L_{FB}^3/L_{IGV}) \times UCF_2 \quad (1)$$

where a length, $L_{IGV}$, is a length in inches along the axial direction of the pre-swirl inlet guide vane at a 15% span location; a length, $L_S$, is a length in inches along the axial direction from a leading edge of the pre-swirl inlet guide vane at the 15% span location to a trailing edge of the fan blade at the tip of the fan blade; a length, $L_{FB}$, is a length in inches along the axial direction of the fan blade along the axial direction at the tip of the fan blade divided by the length; $UCF_1$ is a first unit correction factor equal to $1^{-1}$ inch; and $UCF_2$ is a second unit correction factor equal to $1^{-2}$ inch.

In such a manner, it will be appreciated that the Relationship (1) described above requires the length, $L_{AT}$, of the acoustic treatment to be greater than the length, $L_{IGV}$, squared divided by the length, $L_S$, times a first unit correction factor and less than the length, $L_{FB}$, cubed divided by the length, $L_{IGV}$, times a second unit correction factor.

In particular, the benefits noted above apply to gas turbine engine having the values outlined in TABLE 1, below.

TABLE 1

| | Description | Value |
|---|---|---|
| $L_{IGV}$ | length along the axial direction of the pre-swirl inlet guide vane at a 15% span location | 0.3 inches (in) to 11 in, such as 1.5 in to 9 in |
| $L_S$ | length along the axial direction from a leading edge of the pre-swirl inlet guide vane at the 15% span location to a trailing edge of the fan blade at the tip of the fan blade | 4 in to 30 in, such as 7.5 in to 24 in |
| $L_{FB}$ | length along the axial direction of the fan blade along the axial direction at the tip of the fan blade divided by the length | 3 in to 15 in, such as 5 in to 11 in |
| $L_{AT}$ | length along the axial direction of the acoustic treatment | See Relationship (1), units are inches |

In addition, below are one or more example gas turbine engines of the present disclosure, having an outer nacelle with pre-swirl IGVs and an acoustic treatment. In particular, each of the gas turbine engines defines a length, $L_{IGV}$, in inches along an axial direction of a pre-swirl inlet guide vane at a 15% span location; a length, $L_S$, in inches along the axial direction from a leading edge of the pre-swirl inlet guide vane at the 15% span location to a trailing edge of the fan blade at the tip of the fan blade; a length, $L_{FB}$, is a length in inches along the axial direction of the fan blade along the axial direction at the tip of the fan blade divided by the length; and a length, $L_{AT}$, along an axial direction of the acoustic treatment.

EXAMPLE 1: In a first example gas turbine engine having an outer nacelle with pre-swirl IGVs and an acoustic treatment, the gas turbine engine defines a length, $L_{FB}$, equal to 7.2 inches (in); a length, $L_{IGV}$, equal to 0.4 in; a length, $L_S$, equal to 7.7 in; and a length $L_{AT}$, greater than 0.02 in and less than 1037 in.

EXAMPLE 2: In a first example gas turbine engine having an outer nacelle with pre-swirl IGVs and an acoustic treatment, the gas turbine engine defines a length, $L_{FB}$, equal to 7.2 inches (in); a length, $L_{IGV}$, equal to 2.4 in; a length, $L_S$, equal to 10.8 in; and a length $L_{AT}$, greater than 0.52 in and less than 157.5 in.

EXAMPLE 3: In a first example gas turbine engine having an outer nacelle with pre-swirl IGVs and an acoustic treatment, the gas turbine engine defines a length, $L_{FB}$, equal to 7.2 inches (in); a length, $L_{IGV}$, equal to 3.6 in; a length, $L_S$, equal to 12.6 in; and a length $L_{AT}$, greater than 1.0 in and less than 103.7 in.

EXAMPLE 4: In a first example gas turbine engine having an outer nacelle with pre-swirl IGVs and an acoustic treatment, the gas turbine engine defines a length, $L_{FB}$, equal to 7.2 inches (in); a length, $L_{IGV}$, equal to 5.4 in; a length, $L_S$, equal to 15.3 in; and a length $L_{AT}$, greater than 1.9 in and less than 69.1 in.

EXAMPLE 5: In a first example gas turbine engine having an outer nacelle with pre-swirl IGVs and an acoustic treatment, the gas turbine engine defines a length, $L_{FB}$, equal to 7.2 inches (in); a length, $L_{IGV}$, equal to 7.2 in; a length, $L_S$, equal to 18.0 in; a length $L_{AT}$, greater than 2.9 in and less than 51.8 in.

EXAMPLE 6: In a first example gas turbine engine having an outer nacelle with pre-swirl IGVs and an acoustic treatment, the gas turbine engine defines a length, $L_{FB}$, equal to 7.2 inches (in); a length, $L_{IGV}$, equal to 9 in; a length, $L_S$, equal to 20.7 in; a length $L_{AT}$, greater than 3.9 in and less than 41.5 in.

It will be appreciated, however, that the exemplary embodiments described above with reference to FIGS. 1 through 8 are provided by way of example only. In other exemplary embodiments, the turbofan engine 10, including the outer nacelle 50 and acoustic treatment 120 of the outer nacelle 50, may be arranged in any other suitable manner.

Figure 9:
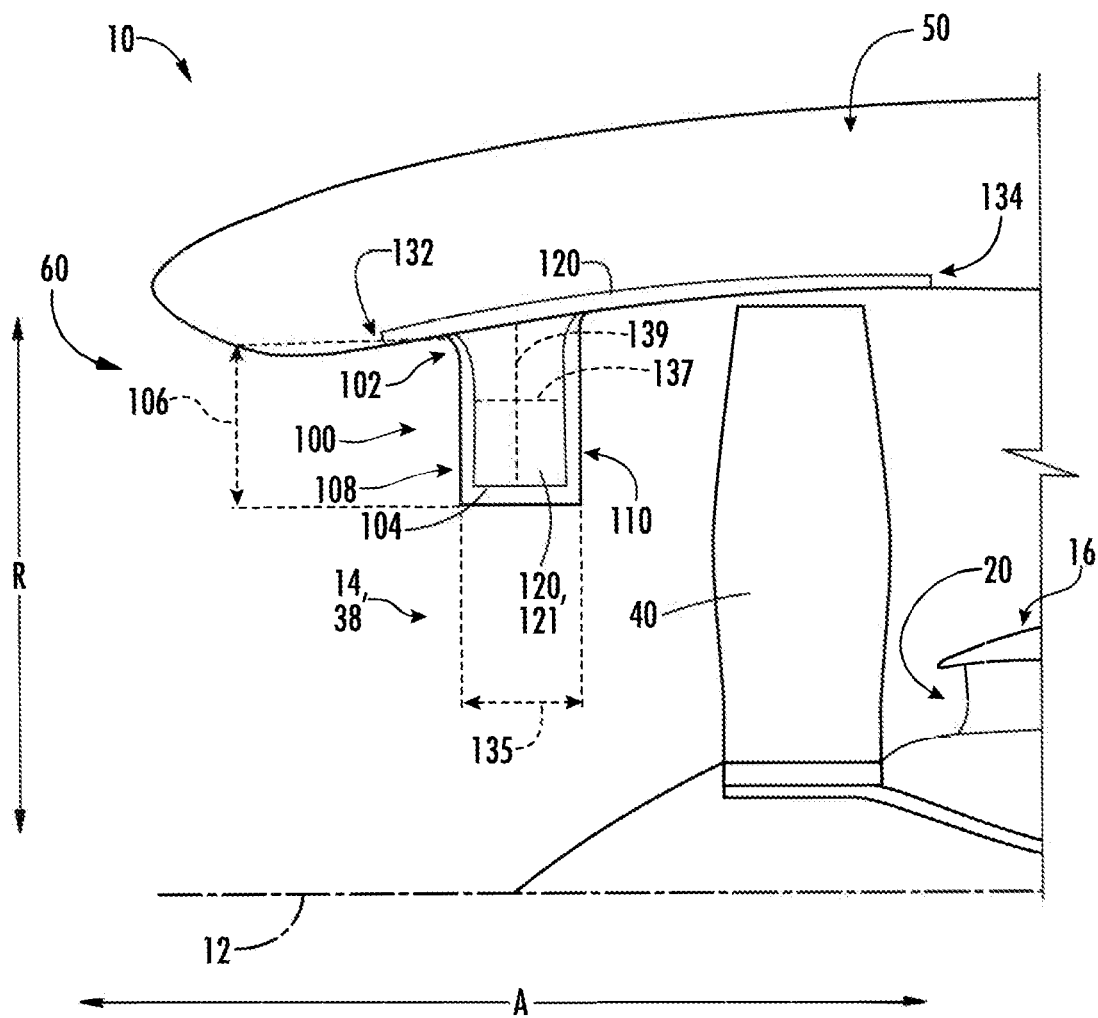
FIG. 9 is a close-up, cross-sectional view of a fan section and forward end of a turbomachine of a turbofan engine in accordance with another exemplary aspect of the present disclosure.

For example, referring now to FIG. 9, a close-up, cross-sectional view of a fan section 14 and forward end of a turbomachine 16 of a turbofan engine 10 in accordance with another exemplary aspect of the present disclosure is provided. The exemplary turbofan engine 10 of FIG. 9 may be configured in a similar manner as the exemplary turbofan engine 10 described above (see, e.g., FIG. 2).

Accordingly, it will be appreciated that the exemplary turbofan engine 10 generally includes the fan section 14 having the fan 38, a turbomachine 16, and an outer nacelle 50 surrounding the fan 38 and at least a portion of the turbomachine 16. The outer nacelle 50 includes a stage of pre-swirl inlet guide vanes 100 forward of the fan 38 and an acoustic treatment 120. However, for the embodiment of FIG. 9, the acoustic treatment 120 further extends onto a pre-swirl inlet guide vane 100 of the stage of a swirl inlet guide vanes 100. In particular, the acoustic treatment 120 includes an inlet guide vane section 121 coupled to or integrated with the pre-swirl inlet guide vane 100.

In the embodiment depicted, the inlet guide vane section 121 extends along a length of a pre-swirl feature span 106 of the pre-swirl inlet guide vane 100 (e.g., at least 90% of the pre-swirl feature span 106 of the pre-swirl inlet guide vane 100), and further extends along a length of a chord 135 of the pre-swirl inlet guide vane 100 (e.g., at least 90% of the chord 135 of the pre-swirl inlet guide vane 100).

In some embodiments, the inlet guide vane section 121 may extend completely around the pre-swirl inlet guide vane 100, e.g., on a pressure side and a suction side of the pre-swirl inlet guide vane 100.

Moreover, as is depicted in phantom, in certain exemplary embodiments, the inlet guide vane section 121 may only extend partially along the pre-swirl feature span 106 of the pre-swirl inlet guide vane 100 (e.g., at least 10% of the pre-swirl feature span 106 of the pre-swirl inlet guide vane 100, and up to 75%, such as up to 50%; ending at reference line 137, provided in phantom).

Further, as also depicted in phantom, in certain exemplary embodiments, the inlet guide vanes section 121 of the acoustic treatment 120 may only extend partially along the chord 135 of the pre-swirl inlet guide vane 100, and may be located closer to a leading edge 108 of the pre-swirl inlet guide vane 100, or alternatively closer to a trailing edge 110 of the pre-swirl inlet guide vane 100 (e.g., starting or ending at a reference line 139, depicted in phantom).

In certain exemplary embodiments, the inlet guide vane section 121 may be located in any one or more of the quadrants formed by reference lines 137, 139.

Referring now generally to FIGS. 10 through 23, various other exemplary embodiments of the present disclosure are provided. Each of FIGS. 10 through 23 provides a plan view of an inner wall 52 of an outer nacelle 50 of a turbofan engine 10 in accordance with an exemplary aspect of the present disclosure, depicting a stage of pre-swirl inlet guide vanes 100 arranged along a circumferential direction C along with an acoustic treatment 120 of the outer nacelle 50. Each of FIGS. 10 through 23 further depicts a length, $L_{AT}$, of the acoustic treatment 120 along an axial direction A of the respective turbofan engine 10, the length, $L_{AT}$, being defined between a forward end 132 of the acoustic treatment 120 and an aft end 134 of the acoustic treatment 120.

Figure 10:
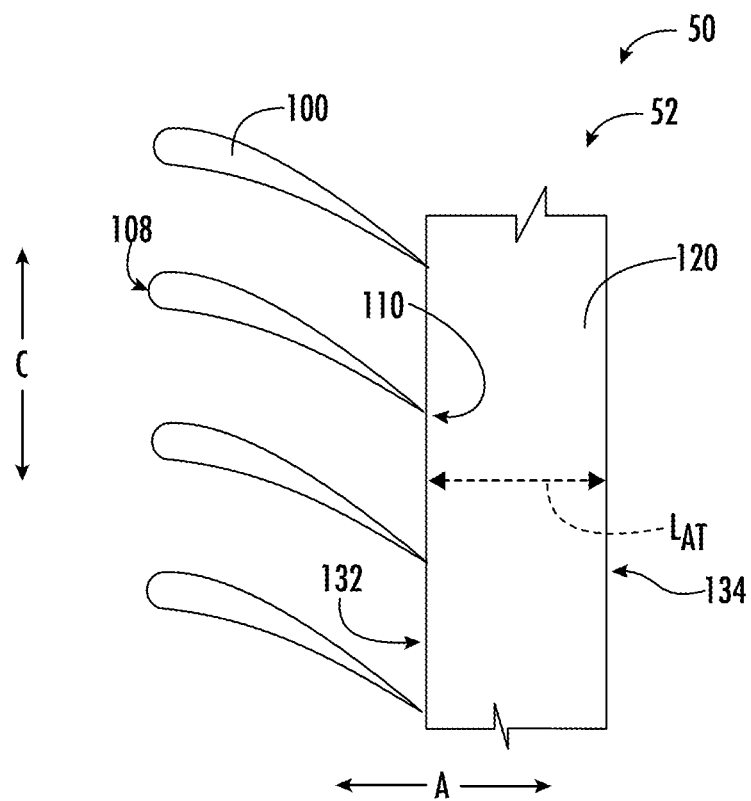
FIG. 10 is a plan view of an inner wall of an outer nacelle of a gas turbine engine in accordance with another exemplary aspect of the present disclosure.

Referring particular to FIG. 10, the acoustic treatment 120 is located aft of the stage of pre-swirl inlet guide vanes 100, with the forward end 132 of the acoustic treatment 120 being aft of a trailing edge 110 of each pre-swirl inlet guide vane 100 of the stage of pre-swirl inlet guide vanes 100.

Figure 11:
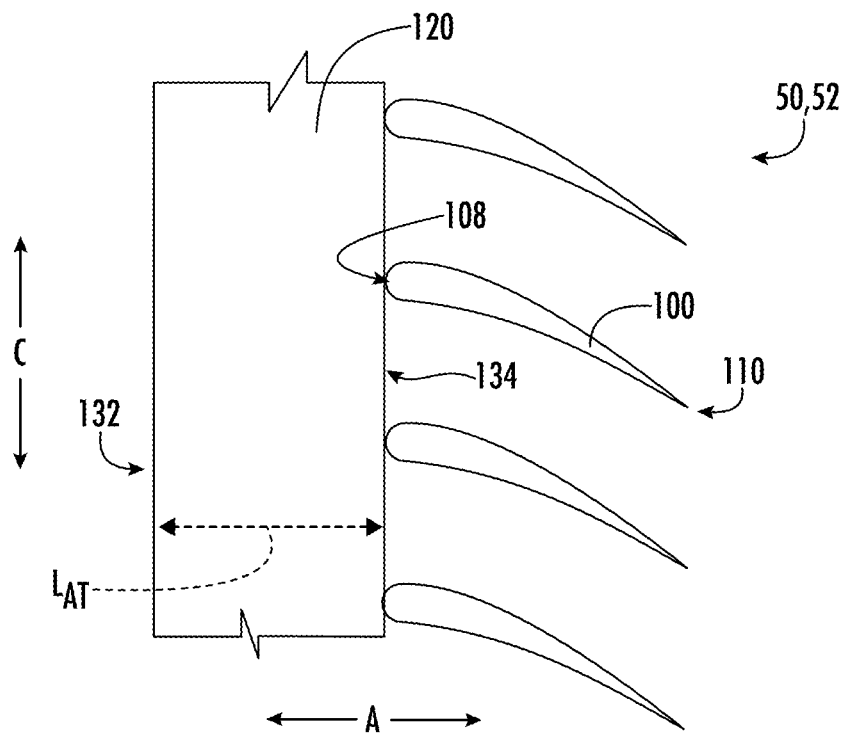
FIG. 11 is a plan view of an inner wall of an outer nacelle of a gas turbine engine in accordance with yet another exemplary aspect of the present disclosure.

By contrast, referring now particular to FIG. 11, the acoustic treatment 120 is located forward of the stage of pre-swirl inlet guide vanes 100, with the aft end 134 of the acoustic treatment 120 being forward of a leading edge 108 of each pre-swirl inlet guide vane 100 of the stage of pre-swirl inlet guide vanes 100.

Figure 12:
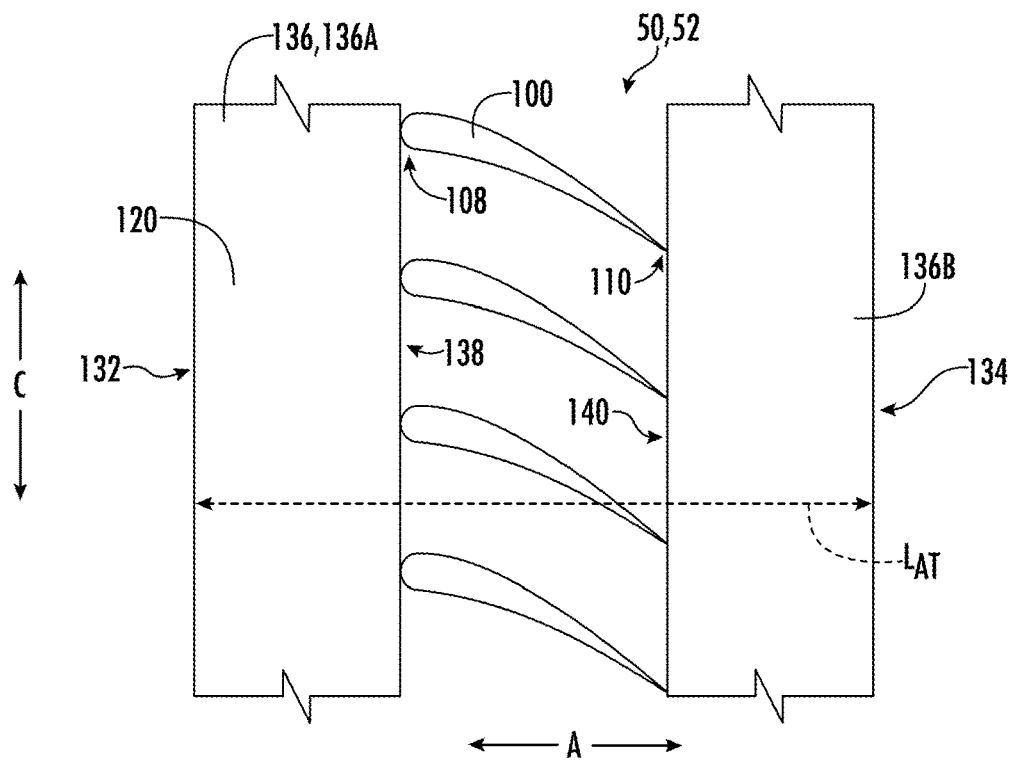
FIG. 12 is a plan view of an inner wall of an outer nacelle of a gas turbine engine in accordance with still another exemplary aspect of the present disclosure.

Further, referring particularly to FIG. 12, the acoustic treatment 120 includes a plurality of acoustic treatment panels 136 spaced along the axial direction A. More specifically, the plurality of acoustic treatment panels 136, for the embodiment shown, includes a first, forward acoustic treatment panel 136A and a second, aft acoustic treatment panel 136B. The forward acoustic treatment panel 136A is located forward of the stage of pre-swirl inlet guide vanes 100, with an aft end 138 of the forward acoustic treatment panel 136A being located forward of a leading edge 108 of each pre-swirl inlet guide vane 100 of the stage of pre-swirl inlet guide vanes 100. The aft acoustic treatment panel 136B is located aft of the stage of pre-swirl inlet guide vanes 100, with a forward end 140 of the aft acoustic treatment panel 136B being located aft of a trailing edge 110 of each pre-swirl inlet guide vane 100 of the stage of pre-swirl inlet guide vanes 100.

Notably, with such a configuration, the length, $L_{AT}$, of the acoustic treatment 120 along the axial direction A is a length, $L_{AT}$, along the axial direction A from a forward end of the forward-most acoustic treatment panel 136A (marked as the forward end 132 of the acoustic treatment 120 in FIG. 12) to an aft end of the aft-most acoustic treatment panel 136B (marked as the aft end 134 of the acoustic treatment 120 in FIG. 12).

Figure 13:
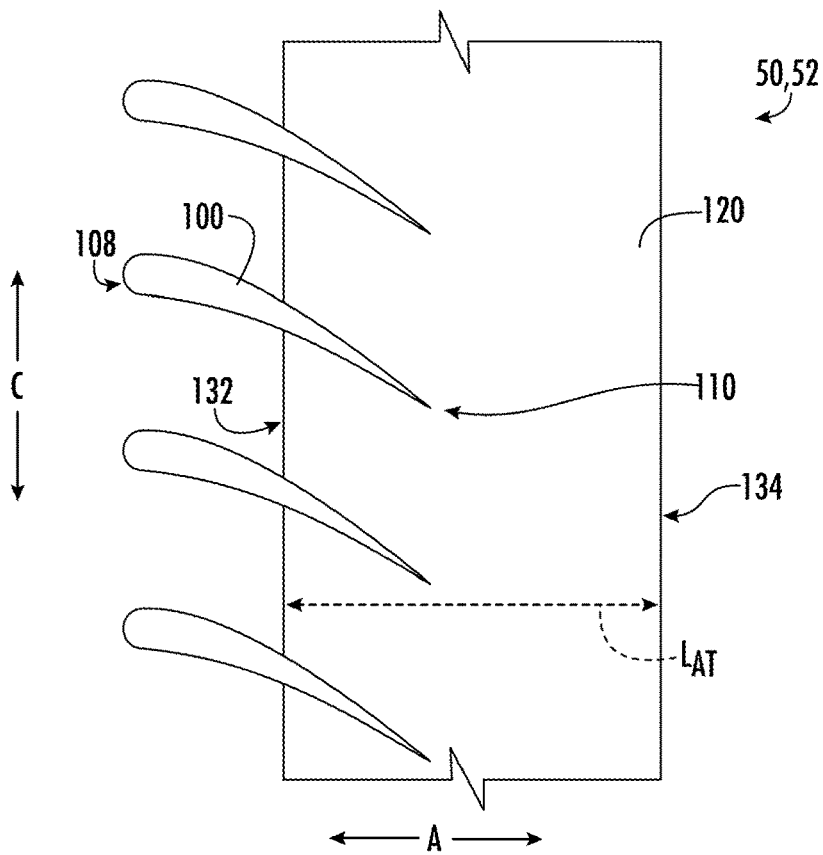
FIG. 13 is a plan view of an inner wall of an outer nacelle of a gas turbine engine in accordance with yet another exemplary aspect of the present disclosure.

Referring now to FIG. 13, the forward end 132 of the acoustic treatment 120 is positioned along the axial direction A at the stage of pre-swirl inlet guide vanes 100. In such a manner, it will be appreciated that in this context, the term "at" refers to having at least a portion positioned at a location along the axial direction A between the leading edge 108 and the trailing edge 110 of each pre-swirl inlet guide vane 100 of the stage of pre-swirl inlet guide vanes 100, or aligned with one of the leading edge 108 and the trailing edge 110 of each pre-swirl inlet guide vane 100 of the stage of pre-swirl inlet guide vanes 100. More specifically, for the embodiment shown, the forward end 132 is positioned at a location along the axial direction A between the leading edge 108 and the trailing edge 110 of each pre-swirl inlet guide vane 100 of the stage of pre-swirl inlet guide vanes 100, and the aft end 134 of the acoustic treatment 120 is positioned aft of the stage of pre-swirl inlet guide vanes 100.

Figure 14:
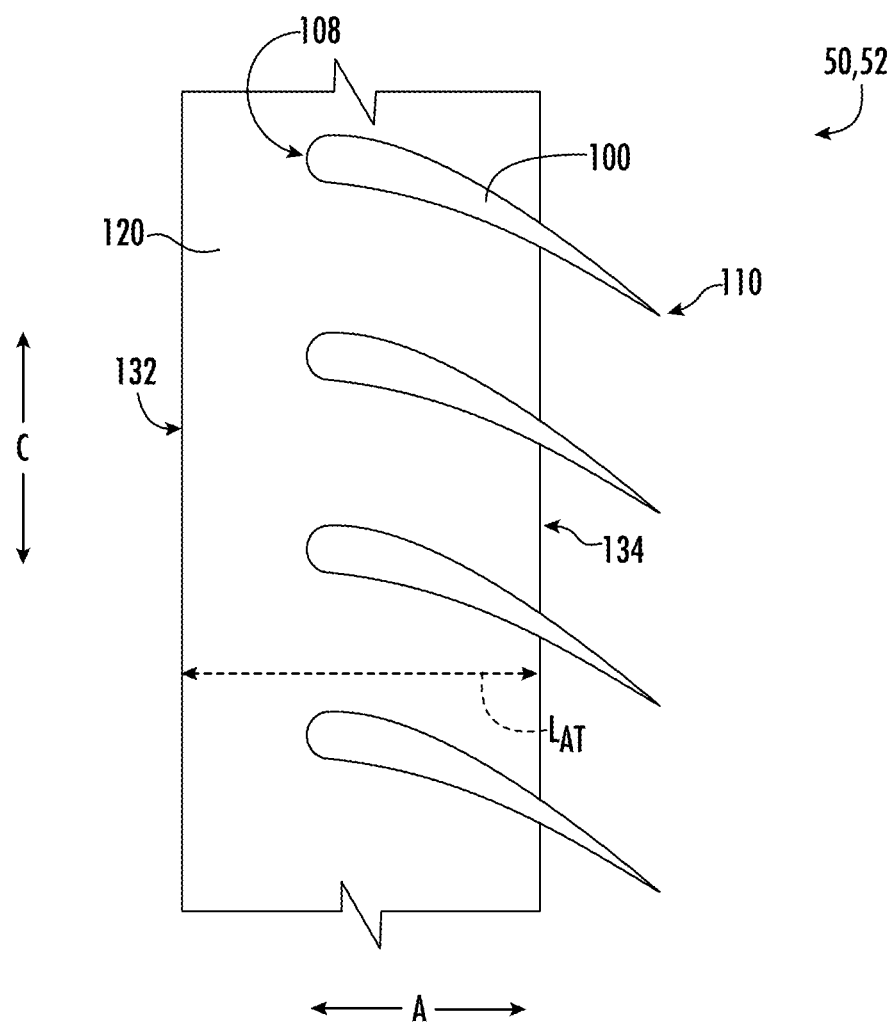
FIG. 14 is a plan view of an inner wall of an outer nacelle of a gas turbine engine in accordance with still another exemplary aspect of the present disclosure.

Referring now to FIG. 14, the aft end 134 of the acoustic treatment 120 is positioned along the axial direction A at the stage of pre-swirl inlet guide vanes 100, and more specifically, at a location along the axial direction A between the leading edge 108 and the trailing edge 110 of each pre-swirl inlet guide vane 100 of the stage of pre-swirl inlet guide vanes 100. The forward end 132 of the acoustic treatment 120 is positioned forward of the stage of pre-swirl inlet guide vanes 100.

Briefly, for the exemplary embodiments of FIGS. 10 through 14, the acoustic treatment 120, and more specifically, each acoustic treatment panel 136 of the acoustic treatment 120, generally includes a linear forward end 132 and a linear aft edge (e.g., the forward end 132 being positioned at a common an axial position along a circumference of the inner wall 52 of the outer nacelle 50, and similarly, the aft end 134 being positioned at a common axial position along a circumference of the inner wall 52 of the outer nacelle 50).

Figure 15:
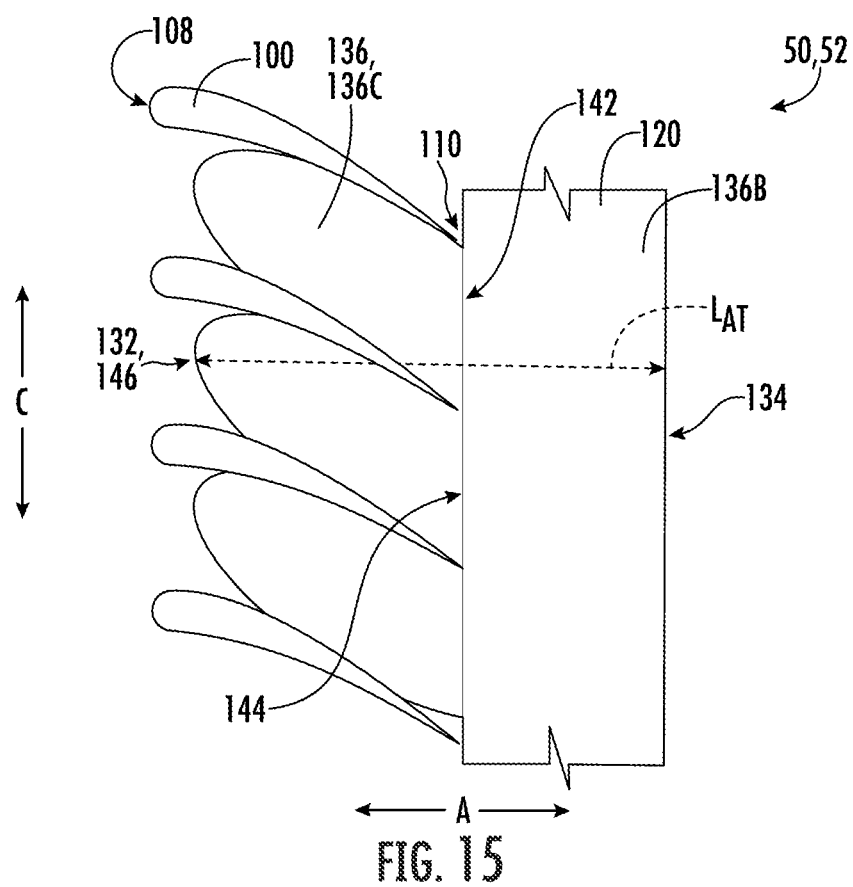
FIG. 15 is a plan view of an inner wall of an outer nacelle of a gas turbine engine in accordance with yet another exemplary aspect of the present disclosure.

Referring now to FIG. 15, the acoustic treatment 120 includes an aft acoustic treatment panel 136B located aft of the stage of pre-swirl inlet guide vanes 100, and a plurality of inter-vane acoustic treatment panels 136C. Each of the plurality of inter-vane acoustic treatment panels 136C is located between adjacent pre-swirl inlet guide vanes 100 of the stage of pre-swirl inlet guide vanes 100. In such a manner, the plurality of inter-vane acoustic treatment panels 136C are spaced along the circumferential direction C.

An aft end 142 of each inter-vane acoustic treatment panel 136C meets with a forward end 144 of the aft acoustic treatment panel 136B. A forward end 146 of each inter-vane acoustic treatment panel 136C is positioned aft of a leading edge 108 of each pre-swirl inlet guide vane 100 of the stage of pre-swirl inlet guide vanes 100. Further, for the embodiment shown, the forward end 146 of each inter-vane acoustic treatment panel 136C defines a rounded shape between adjacent pre-swirl inlet guide vanes 100.

Notably, with such a configuration, the length, $L_{AT}$, of the acoustic treatment 120 along the axial direction A is a length, $L_{AT}$, along the axial direction A from the forward end 146 of the inter-vane acoustic treatment panel 136C to an aft end of the aft acoustic treatment panel 136B (marked as the aft end 134 of the acoustic treatment 120 in FIG. 15).

Figure 16:
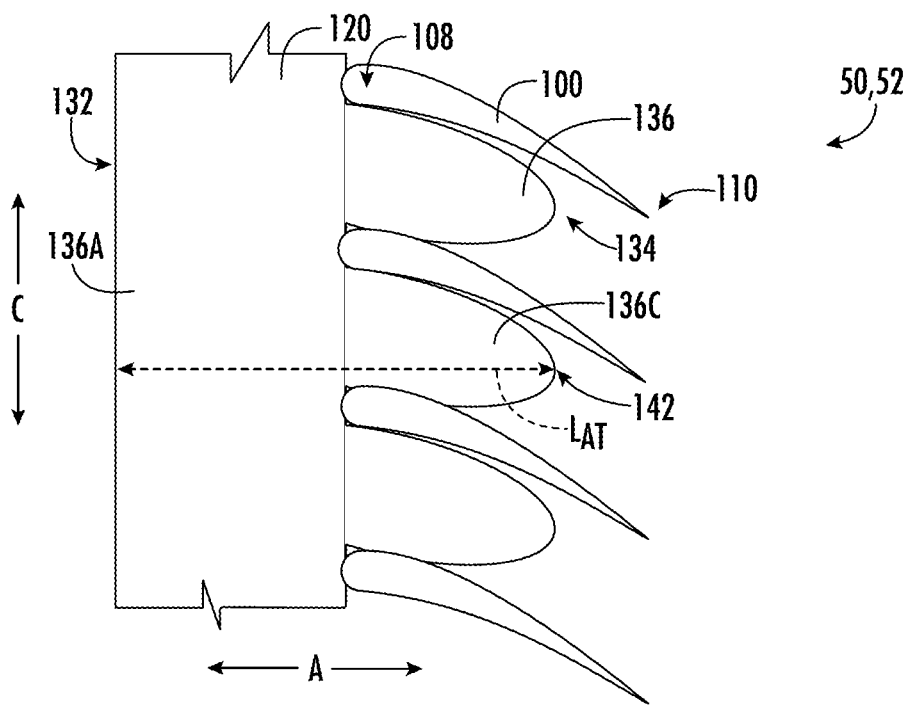
FIG. 16 is a plan view of an inner wall of an outer nacelle of a gas turbine engine in accordance with still another exemplary aspect of the present disclosure.

By contrast, referring now to FIG. 16, the acoustic treatment 120 includes a first, forward acoustic treatment panel 136A located forward of the stage of pre-swirl on the guide vanes, and a plurality of inter-vane acoustic treatment panels 136C. Each of the plurality of inter-vane acoustic treatment panels 136C is located between adjacent pre-swirl inlet guide vanes 100 of the stage of pre-swirl inlet guide vanes 100. A forward end 146 of each inter-vane acoustic treatment panel 136C meets with the forward acoustic treatment panel 136A. An aft end 142 of each inter-vane acoustic treatment panel 136C is positioned forward of the trailing edge 110 of each pre-swirl inlet guide vane 100 of the stage of pre-swirl inlet guide vanes 100. Further, for the embodiment shown, the aft end 142 of each inter-vane acoustic treatment panel 136C defines a rounded shape between adjacent pre-swirl inlet guide vanes 100.

Notably, with such a configuration, the length, $L_{AT}$, of the acoustic treatment 120 along the axial direction A is a length, $L_{AT}$, along the axial direction A from the forward end of the forward acoustic treatment panel 136A (marked as the forward end 132 of the acoustic treatment 120 in FIG. 16) to the aft end 142 of the inter-vane acoustic treatment panels 136C.

Figure 17:
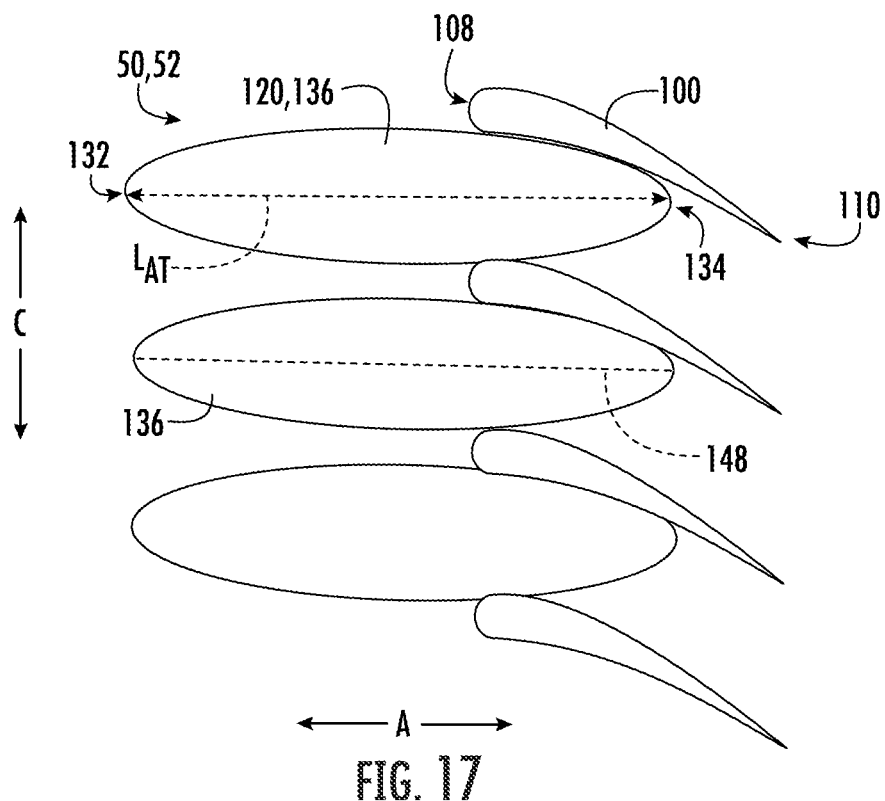
FIG. 17 is a plan view of an inner wall of an outer nacelle of a gas turbine engine in accordance with yet another exemplary aspect of the present disclosure.

Referring now to FIG. 17, the acoustic treatment 120 includes a plurality of acoustic treatment panels 136 spaced along a circumferential direction C of the turbofan engine 10. Each acoustic treatment panel 136 of the plurality of acoustic treatment panels 136 defines a rounded forward end (marked as the forward end 132 of the acoustic treatment 120 in FIG. 17) and a rounded aft end (marked as the aft end 134 of the acoustic treatment 120 in FIG. 17). For the embodiment depicted, the forward end of each acoustic treatment panel 136 is located forward of the stage of pre-swirl inlet guide vanes 100 and the aft end of each acoustic treatment panel 136 is located at the stage of pre-swirl inlet guide vanes 100. More specifically, the aft end of each acoustic treatment panel is located aft of the leading edge 108 of each pre-swirl inlet guide vane 100, and forward of the trailing edge 110 of each pre-swirl inlet guide vane 100.

Each acoustic treatment panel 136 generally defines a centerline 148 extending from the forward end to the aft end. In the embodiment shown, the centerline 148 extends parallel to the axial direction A.

Figure 18:
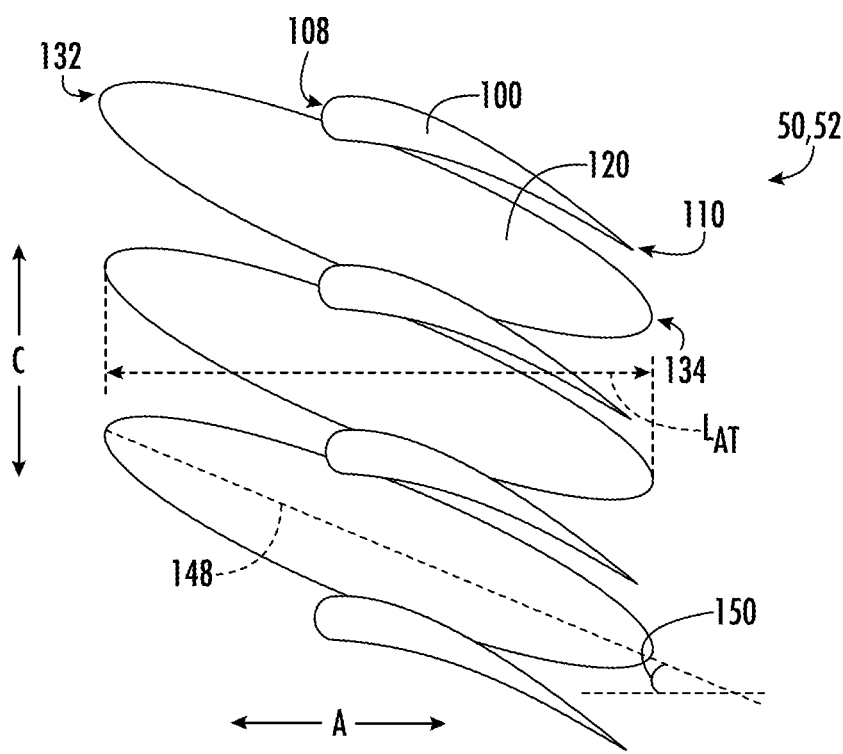
FIG. 18 is a plan view of an inner wall of an outer nacelle of a gas turbine engine in accordance with still another exemplary aspect of the present disclosure.

Referring now to FIG. 18, the acoustic treatment 120 again includes a plurality of acoustic treatment panels 136 spaced along the circumferential direction C. The acoustic treatment panels 136 of FIG. 18 each include a forward end (marked as the forward end 132 of the acoustic treatment 120 in FIG. 18) located forward of the stage of pre-swirl inlet guide vanes 100 and a rounded aft end (marked as the aft end 134 of the acoustic treatment 120 in FIG. 18) located at the stage of pre-swirl inlet guide vanes 100. In particular, for the embodiment shown, the aft end of each acoustic treatment panel 136 is aligned with a trailing edge 110 of each pre-swirl inlet guide vane 100 along the axial direction A.

In the embodiment shown, each acoustic treatment panel 136 defines a centerline 148 extending from the forward end 132 to the aft end 134. The centerline 148 defines an angle 150 with the axial direction A greater than 0 degrees and less than 90 degrees, such as greater than 15 degrees and less than 45 degrees.

Figure 19:
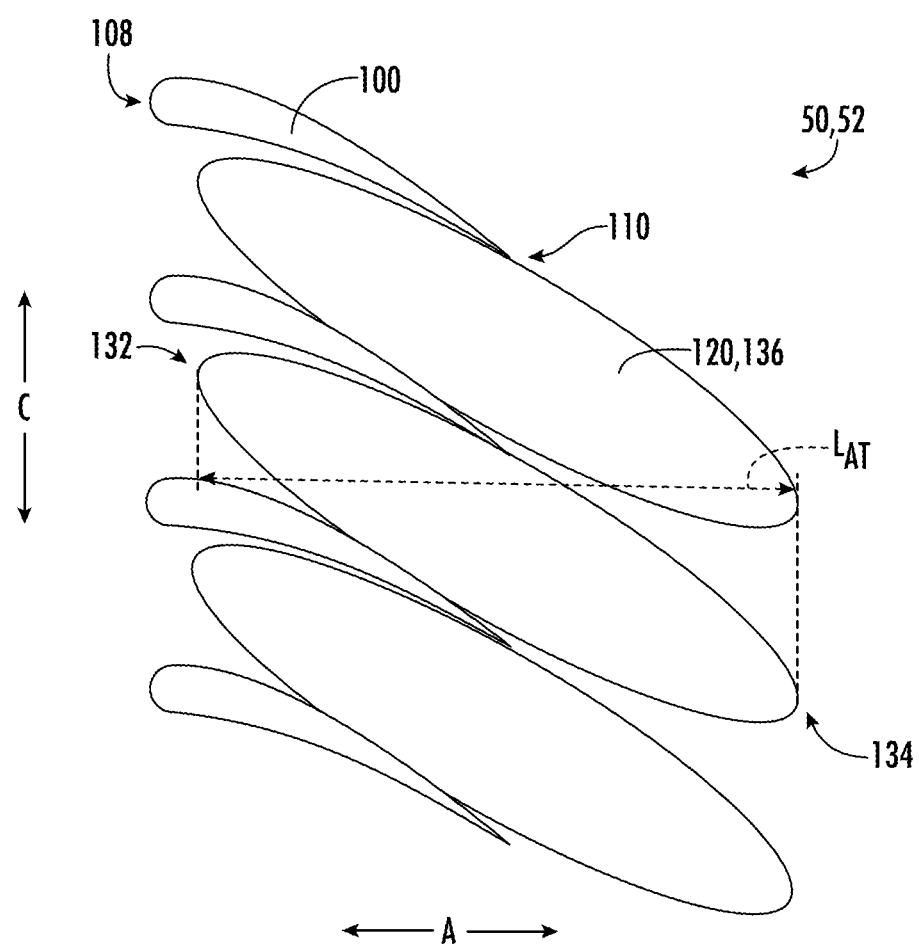
FIG. 19 is a plan view of an inner wall of an outer nacelle of a gas turbine engine in accordance with yet another exemplary aspect of the present disclosure.

Referring now to FIG. 19, the acoustic treatment 120 is configured in a similar manner as exemplary embodiment of FIG. 18. However, for the embodiment of FIG. 19, a forward end (marked as the forward end 132 of the acoustic treatment 120 in FIG. 19) of each acoustic treatment panel 136 is positioned at the stage of pre-swirl inlet guide vanes 100 and an aft end (marked as the aft end 134 of the acoustic treatment 120 in FIG. 19) of each acoustic treatment panels 136 located aft of the stage of pre-swirl inlet guide vanes 100.

Figure 20:
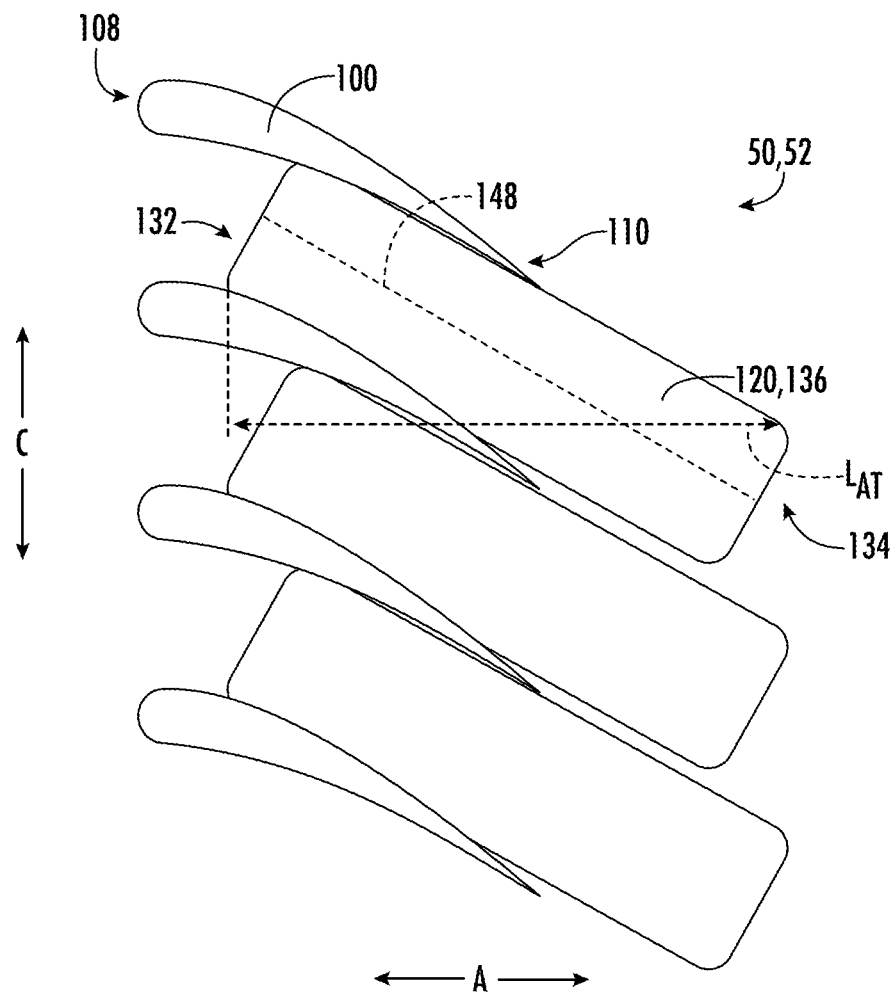
FIG. 20 is a plan view of an inner wall of an outer nacelle of a gas turbine engine in accordance with still another exemplary aspect of the present disclosure.

Referring now to FIG. 20, the acoustic treatment 120 is configured in a similar manner as the exemplary acoustic treatment 120 of FIG. 19. However, for the embodiment of FIG. 20, each acoustic treatment panel 136 defines a rectangular shape as opposed to a generally circular shape. In such a manner, the forward end (marked as the forward end 132 of the acoustic treatment 120 in FIG. 20) of each acoustic treatment panel 136 extends in a linear direction perpendicular to a centerline 148 of the respective acoustic treatment panel 136. Similarly, the aft end (marked as the aft end 134 of the acoustic treatment 120 in FIG. 20) of each acoustic treatment panel 136 extends in a linear direction perpendicular to the centerline 148 of the respective acoustic treatment panel 136.

Figure 21:
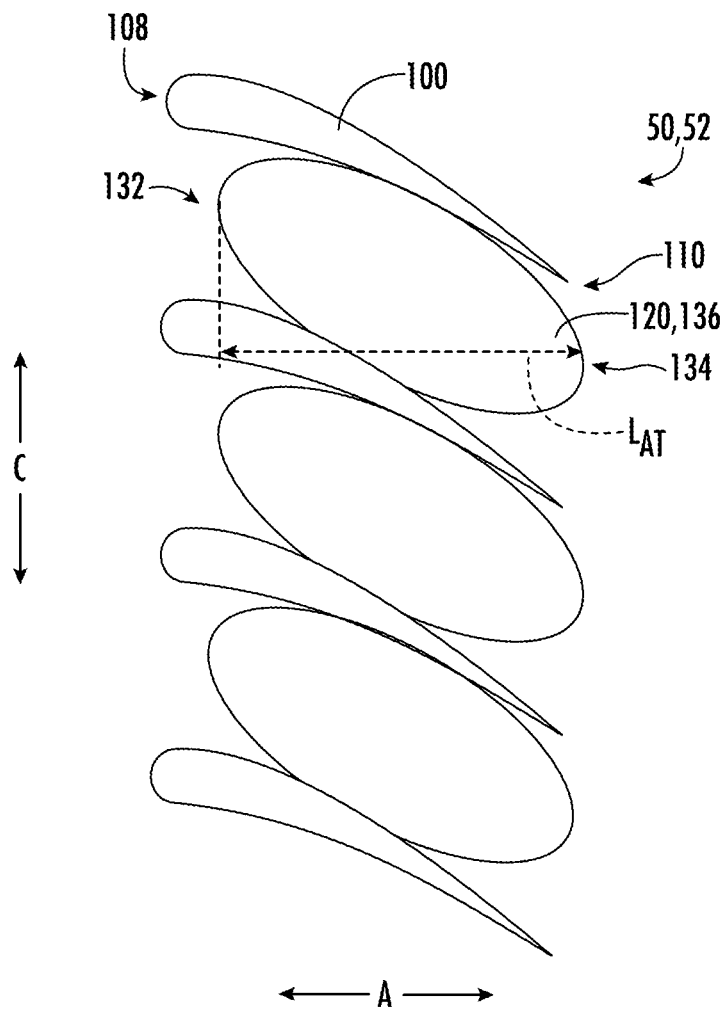
FIG. 21 is a plan view of an inner wall of an outer nacelle of a gas turbine engine in accordance with yet another exemplary aspect of the present disclosure.

Referring now to FIG. 21, the acoustic treatment 120 again includes a plurality of acoustic treatment panels 136, with each of the plurality of acoustic treatment panels 136 defining a forward end (marked as the forward end 132 of the acoustic treatment 120 in FIG. 21) having a circular shape and an aft end (marked as the aft end 134 of the acoustic treatment 120 in FIG. 21) having a circular shape. For the embodiment of FIG. 21, each acoustic treatment panel 136 is positioned at the stage of pre-swirl inlet guide vanes 100, and more specifically, the forward end of each acoustic treatment panel 136 is located at or aft of the leading edge 108 of each pre-swirl inlet guide vane 100, and the aft end of each acoustic treatment panel 136 is located at or forward of the trailing edge of each pre-swirl inlet guide vane 100.

Figure 22:
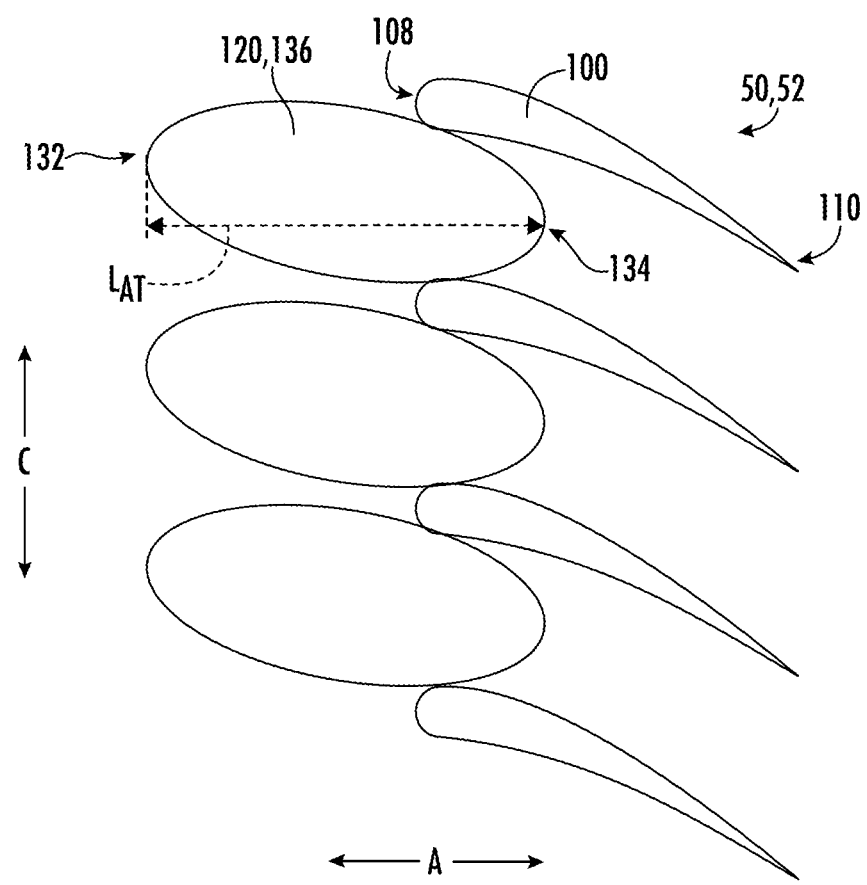
FIG. 22 is a plan view of an inner wall of an outer nacelle of a gas turbine engine in accordance with still another exemplary aspect of the present disclosure.

Referring now to FIG. 22, the acoustic treatment 120 is configured in a similar manner as exemplary embodiment of FIG. 21. However, for the embodiment of FIG. 22, each acoustic treatment panel 136 of the plurality of acoustic treatment panels 136 is positioned at least partially forward of the stage of pre-swirl inlet guide vanes 100.

Figure 23:
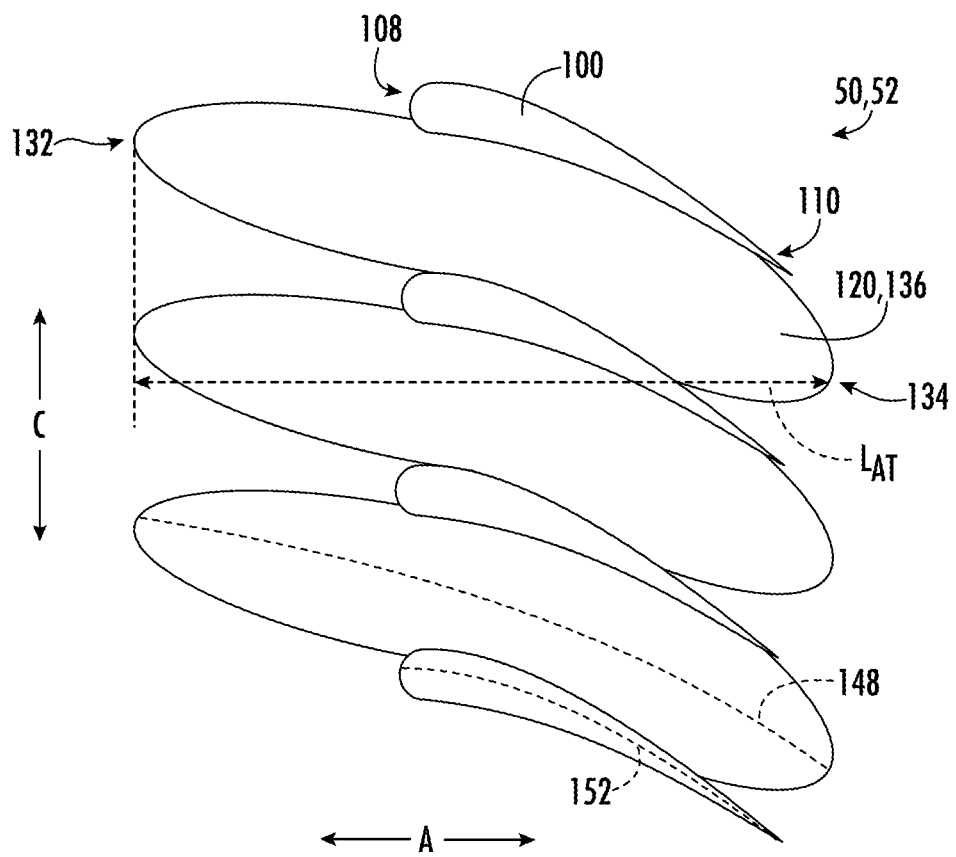
FIG. 23 is a plan view of an inner wall of an outer nacelle of a gas turbine engine in accordance with yet another exemplary aspect of the present disclosure.

Referring now to FIG. 23, the acoustic treatment 120 again includes a plurality of acoustic treatment panels 136 spaced along a circumferential direction C of the turbofan engine 10, with each acoustic treatment panel 136 including a forward end (marked as the forward end 132 of the acoustic treatment 120 in FIG. 23) defining a rounded shape and an aft end (marked as the aft end 134 of the acoustic treatment 120 in FIG. 23) defining a rounded shape. For the embodiment of FIG. 23, the forward end of each acoustic treatment panels 136 located forward of the stage of pre-swirl inlet guide vanes 100 and the aft end of each acoustic treatment panel 136 is located aft of the stage of pre-swirl inlet guide vanes 100.

Moreover, for the embodiment of FIG. 23, each acoustic treatment panel 136 defines a centerline 148. However, the centerline 148 of each acoustic treatment panel 136 in the embodiment of FIG. 23 extends at least partially in a nonlinear direction. For example, in the embodiment of FIG. 23, the centerline 148 of each acoustic treatment panel 136 defines a curve where the centerline 148 extends through the stage of pre-swirl inlet guide vanes 100. The curve of the centerline 148 of each acoustic treatment panel 136 is generally complementary to a camber line 152 of the pre-swirl inlet guide vanes 100.

Further aspects are provided by the subject matter of the following clauses:

A gas turbine engine defining an axial direction and a radial direction, the gas turbine engine comprising: a turbomachine; a fan rotatable by the turbomachine, the fan comprising a fan blade, the fan blade defining an outer tip along the radial direction, a trailing edge at the tip, and a length, $L_{FB}$, at the tip along the axial direction; and an outer nacelle surrounding the fan and surrounding at least in part the turbomachine, the outer nacelle comprising a stage of pre-swirl inlet guide vanes located upstream of the fan, the stage of pre-swirl inlet guide vanes having a pre-swirl inlet guide vane defining a 15% span location and a leading edge at the 15% span location, the pre-swirl inlet guide vane further defining a length, $L_{IGV}$, along the axial direction at a 15% span location, the outer nacelle further comprising an inner surface along the radial direction and an acoustic treatment coupled to or integrated with the inner surface, the acoustic treatment defining a length, $L_{AT}$, along the axial direction; wherein the gas turbine engine defines a length, $L_S$, from the leading edge of the pre-swirl inlet guide vane at the 15% span location to the trailing edge of the fan blade at the tip of the fan blade, and wherein the length, $L_{AT}$, of the acoustic treatment is as follows: $(L_{IGV}^2/L_S) \times UCF_1 < L_{AT} < (L_{FB}^3/L_{IGV}) \times UCF_2$, where $UCF_1$ is a first unit correction factor equal to $1^{-1}$ inch and $UCF_2$ is a second unit correction factor equal to $1^{-2}$ inch.

The gas turbine engine of any preceding clause, wherein the length, $L_{IGV}$, is greater than or equal to 0.3 inches and less than or equal to 11 inches, and wherein the length, $L_{FB}$, is greater than or equal to 3 inches and less than or equal to 15 inches.

The gas turbine engine of any preceding clause, wherein the length, $L_{IGV}$, is greater than or equal to 1.5 inches and less than or equal to 9 inches, and wherein the length, $L_{FB}$, is greater than or equal to 5 inches and less than or equal to 11 inches.

The gas turbine engine of any preceding clause, wherein the length, $L_S$, is greater than or equal to 4 inches and less than or equal to 30 inches.

The gas turbine engine of any preceding clause, wherein the length, $L_S$, is greater than or equal to 7.5 inches and less than or equal to 24 inches.

The gas turbine engine of any preceding clause, wherein the acoustic treatment is integrated into the inner surface of the outer nacelle.

The gas turbine engine of any preceding clause, wherein the acoustic treatment is positioned along the axial direction at least partially between the stage of pre-swirl inlet guide vanes and the tip of the fan blade.

The gas turbine engine of any preceding clause, wherein the acoustic treatment is positioned along the axial direction at least partially at the stage of pre-swirl inlet guide vanes.

The gas turbine engine of any preceding clause, wherein the acoustic treatment is positioned along the axial direction at least partially at the tip of the fan blade.

The gas turbine engine of any preceding clause, wherein the acoustic treatment is at least in part integrated with a surface of the pre-swirl inlet guide vane.

The gas turbine engine of any preceding clause, wherein the acoustic treatment extends continuously along a circumference of the inner surface of the outer nacelle.

The gas turbine engine of any preceding clause, wherein the acoustic treatment comprises a plurality of acoustic treatment panels.

The gas turbine engine of any preceding clause, wherein the plurality of acoustic treatment panels are spaced along a circumferential direction of the gas turbine engine.

The gas turbine engine of any preceding clause, wherein the plurality of acoustic treatment panels are spaced along the axial direction of the gas turbine engine.

The gas turbine engine of any preceding clause, wherein the acoustic treatment extends from a location forward of the stage of pre-swirl inlet guide vanes to a location aft of the stage of pre-swirl inlet guide vanes.

The gas turbine engine of any preceding clause, wherein the gas turbine engine is configured as a direct drive gas turbine engine.

The gas turbine engine of any preceding clause, wherein the pre-swirl inlet guide vane defines a span, wherein the fan blade defines a fan diameter, and wherein the span is greater than or equal to 5% of the fan blade diameter and less than or equal to 50% of the fan blade diameter.

The gas turbine engine of any preceding clause, wherein the pre-swirl inlet guide vane is attached to or integrated with a body of the nacelle.

The gas turbine engine of any preceding clause, wherein the acoustic treatment comprises a perforated sheet and a hollow body.

The gas turbine engine of any preceding clause, wherein the acoustic treatment includes at least a portion that extends to the pre-swirl inlet guide vane.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine defining an axial direction and a radial direction, the gas turbine engine comprising:
    a turbomachine;
    a fan rotatable by the turbomachine, the fan comprising a fan blade, the fan blade defining an outer tip along the radial direction, a trailing edge at the outer tip, and a length, $L_{FB}$, at the outer tip along the axial direction; and
    an outer nacelle surrounding the fan and surrounding at least in part the turbomachine, the outer nacelle comprising a stage of pre-swirl inlet guide vanes located upstream of the fan, the stage of pre-swirl inlet guide vanes having a pre-swirl inlet guide vane defining a 15% span location and a leading edge at the 15% span location, the pre-swirl inlet guide vane further defining a length, $L_{IGV}$, along the axial direction at the 15% span location, the outer nacelle further comprising an inner surface along the radial direction and an acoustic treatment coupled to or integrated with the inner surface, the acoustic treatment defining a length, $L_{AT}$, along the axial direction; wherein the gas turbine engine defines a length, $L_S$, from the leading edge of the pre-swirl inlet guide vane at the 15% span location to the trailing edge of the fan blade at the outer tip of the fan blade, and wherein the length, $L_{AT}$, of the acoustic treatment is as follows: $(L_{IGV}^2/L_S) \times UCF_1 < L_{AT} < (L_{FB}^3/L_{IGV}) \times UCF_2$, wherein $UCF_1$ is a first unit correction factor equal to $1^{-1}$ inch and $UCF_2$ is a second unit correction factor equal to $1^{-2}$ inch.

2. The gas turbine engine of claim 1, wherein the length, $L_{IGV}$, is greater than or equal to 0.3 inches and less than or equal to 11 inches, and wherein the length, $L_{FB}$, is greater than or equal to 3 inches and less than or equal to 15 inches.

3. The gas turbine engine of claim 1, wherein the length, $L_{IGV}$, is greater than or equal to 1.5 inches and less than or equal to 9 inches, and wherein the length, $L_{FB}$, is greater than or equal to 5 inches and less than or equal to 11 inches.

4. The gas turbine engine of claim 1, wherein the length, $L_S$, is greater than or equal to 4 inches and less than or equal to 30 inches.

5. The gas turbine engine of claim 1, wherein the length, $L_S$, is greater than or equal to 7.5 inches and less than or equal to 24 inches.

6. The gas turbine engine of claim 1, wherein the acoustic treatment is integrated into the inner surface of the outer nacelle.

7. The gas turbine engine of claim 1, wherein the acoustic treatment is positioned along the axial direction at least partially between the stage of pre-swirl inlet guide vanes and the outer tip of the fan blade.

8. The gas turbine engine of claim 1, wherein the acoustic treatment is positioned along the axial direction at least partially at the stage of pre-swirl inlet guide vanes.

9. The gas turbine engine of claim 1, wherein the acoustic treatment is positioned along the axial direction at least partially at the outer tip of the fan blade.

10. The gas turbine engine of claim 1, wherein the acoustic treatment is at least in part integrated with a surface of the pre-swirl inlet guide vane.

11. The gas turbine engine of claim 1, wherein the acoustic treatment extends continuously along a circumference of the inner surface of the outer nacelle.

12. The gas turbine engine of claim 1, wherein the acoustic treatment comprises a plurality of acoustic treatment panels.

13. The gas turbine engine of claim 12, wherein the plurality of acoustic treatment panels are spaced along a circumferential direction of the gas turbine engine.

14. The gas turbine engine of claim 12, wherein the plurality of acoustic treatment panels are spaced along the axial direction of the gas turbine engine.

15. The gas turbine engine of claim 1, wherein the acoustic treatment extends from a first location forward of the stage of pre-swirl inlet guide vanes to a second location aft of the stage of pre-swirl inlet guide vanes.

16. The gas turbine engine of claim 1, wherein the gas turbine engine is configured as a direct drive gas turbine engine.

17. The gas turbine engine of claim 1, wherein the pre-swirl inlet guide vane defines a span, wherein the fan blade defines a fan blade diameter, and wherein the span is greater than or equal to 5% of the fan blade diameter and less than or equal to 50% of the fan blade diameter.

18. The gas turbine engine of claim 1, wherein the pre-swirl inlet guide vane is attached to or integrated with a body of the outer nacelle.

19. The gas turbine engine of claim 1, wherein the acoustic treatment comprises a perforated sheet and a hollow body.

20. The gas turbine engine of claim 1, wherein the acoustic treatment includes at least a portion that extends to the pre-swirl inlet guide vane.

* * * * *